(12) United States Patent
Budhia et al.

(10) Patent No.: US 10,358,045 B2
(45) Date of Patent: Jul. 23, 2019

(54) METHODS AND APPARATUS FOR WIRELESSLY TRANSFERRING POWER

(71) Applicant: WiTricity Corporation, Watertown, MA (US)

(72) Inventors: Mickel Bipin Budhia, Auckland (NZ); Chang-Yu Huang, Auckland (NZ); Hao Hao, Auckland (NZ); Michael Le Gallais Kissin, Auckland (NZ)

(73) Assignee: WiTricity Corporation, Watertown, MA (US)

( * ) Notice: Subject to any disclaimer, the term of this patent is extended or adjusted under 35 U.S.C. 154(b) by 280 days.

(21) Appl. No.: 15/152,395

(22) Filed: May 11, 2016

(65) Prior Publication Data

US 2017/0326991 A1 Nov. 16, 2017

(51) Int. Cl.
*B60L 11/18* (2006.01)
*H01F 27/24* (2006.01)
(Continued)

(52) U.S. Cl.
CPC .............. *B60L 11/182* (2013.01); *B60L 53/12* (2019.02); *B60L 53/38* (2019.02); *H01F 27/06* (2013.01);
(Continued)

(58) Field of Classification Search
CPC .... B60L 11/182; B60L 11/1829; H01F 38/14; H01F 27/255; H01F 27/06; H01F 27/24;
(Continued)

(56) References Cited

U.S. PATENT DOCUMENTS 5,867,101 A * 2/1999 Copeland ........... G08B 13/2411
340/551
2013/0334891 A1* 12/2013 Komma .................. H01F 38/14
307/104

(Continued)

FOREIGN PATENT DOCUMENTS

| JP | 2001297918 A | 10/2001 |
| JP | 2015088668 A | 5/2015 |
| JP | 2015179704 A | 10/2015 |
| WO | WO-2013019122 A1 | 2/2013 |
| WO | WO-2014070443 A2 | 5/2014 |
| WO | WO-2015094964 A1 | 6/2015 |

OTHER PUBLICATIONS

International Search Report and Written Opinion—PCT/US2017/026427—ISA/EPO—dated Jun. 19, 2017.

(Continued)

*Primary Examiner* — Jared Fureman
*Assistant Examiner* — Michael J Warmflash
(74) *Attorney, Agent, or Firm* — Knobbe Martens Olson & Bear LLP

(57) ABSTRACT

Aspects of this disclosure include an apparatus configured to and methods for the transfer of wireless power. The apparatus comprises a first coil enclosing a first area. The apparatus also comprises a second coil enclosing a second area different than the first area, the second coil positioned to be at least partially coplanar with the first coil. The apparatus further comprises a ferrite material and a third coil and a fourth coil each wound about the ferrite material, the third coil at least partially enclosed by the first coil and the fourth coil at least partially enclosed by the second coil.

28 Claims, 16 Drawing Sheets

(51) Int. Cl.
| | |
|---|---|
| *H02J 50/12* | (2016.01) |
| *H01F 27/06* | (2006.01) |
| *H01F 27/28* | (2006.01) |
| *H01F 38/14* | (2006.01) |
| *H02J 7/02* | (2016.01) |
| *H01F 27/255* | (2006.01) |
| *H02J 50/10* | (2016.01) |
| *B60L 53/12* | (2019.01) |
| *B60L 53/38* | (2019.01) |
| *H02J 50/40* | (2016.01) |
| *H02J 50/70* | (2016.01) |

(52) U.S. Cl.
CPC ......... *H01F 27/24* (2013.01); *H01F 27/255* (2013.01); *H01F 27/2823* (2013.01); *H01F 38/14* (2013.01); *H02J 7/025* (2013.01); *H02J 50/10* (2016.02); *H02J 50/12* (2016.02); *H02J 50/40* (2016.02); *H02J 50/70* (2016.02); *Y02T 10/7005* (2013.01); *Y02T 10/7072* (2013.01); *Y02T 90/12* (2013.01); *Y02T 90/121* (2013.01); *Y02T 90/122* (2013.01); *Y02T 90/125* (2013.01); *Y02T 90/14* (2013.01)

(58) Field of Classification Search
CPC ....... H01F 27/2823; H02J 50/10; H02J 7/025; H02J 50/12; H02J 50/40; H02J 50/70
See application file for complete search history.

(56) References Cited

U.S. PATENT DOCUMENTS

| | | | |
|---|---|---|---|
| 2014/0125275 A1 | 5/2014 | Low et al. | |
| 2014/0239729 A1* | 8/2014 | Covic | H02J 17/00 307/104 |
| 2014/0327391 A1* | 11/2014 | Niederhauser | B60L 11/182 320/108 |
| 2015/0145340 A1* | 5/2015 | Chiyo | H01F 27/38 307/104 |
| 2016/0035486 A1* | 2/2016 | Turki | H01F 27/006 307/104 |

OTHER PUBLICATIONS

Raabe S., et al., "Practical Design Considerations for Contactless Power Transfer Quadrature Pick-Ups", IEEE Transactions on Industrial Electronics, vol. 60 (1), Jan. 1, 2013, XP055378998, pp. 400-409.

Beh H.Z., et al., "Magnetic Couplers in Kickstands for Wireless Charging of Electric Bicycles," Twenty-Ninth Annual IEEE Applied Power Electronics Conference and Exposition (APEC), Mar. 2014, pp. 1348-1355.

Sotiriou S., "Analysis of Operation and System Losses of an Inductive Power Transfer System for Wireless Charging of Electric Vehicles," Sep. 2014, 116 pages.

* cited by examiner

METHODS AND APPARATUS FOR WIRELESSLY TRANSFERRING POWER

FIELD

The present disclosure relates generally to wireless power transfer, and more specifically to devices, systems, and methods related to wireless power transfer to remote systems such as electric vehicles using various antenna or coil topologies.

BACKGROUND

Remote systems, such as vehicles, have been introduced that include locomotion power derived from electricity received from an energy storage device such as a battery. For example, hybrid electric vehicles include on-board chargers that use power from vehicle braking and traditional motors to charge the vehicles. Vehicles that are solely electric generally receive the electricity for charging the batteries from other sources. Battery electric vehicles (electric vehicles) are often proposed to be charged through some type of wired alternating current (AC) such as household or commercial AC supply sources. The wired charging connections require cables or other similar connectors that are physically connected to a power supply. Cables and similar connectors may sometimes be inconvenient or cumbersome and have other drawbacks. Wireless charging systems that are capable of transferring power in free space (e.g., via a wireless field) to be used to charge electric vehicles may overcome some of the deficiencies of wired charging solutions. As such, wireless charging systems and methods that efficiently and safely transfer power for charging electric vehicles.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

An aspect disclosed herein comprises an apparatus for wireless power transfer. The apparatus comprises a first coil enclosing a first area and a second coil enclosing a second area different than the first area, the second coil positioned to be at least partially coplanar with the first coil. The apparatus further comprises a ferrite material. The apparatus also comprises a third coil and a fourth coil each wound about the ferrite material. The third coil is at least partially enclosed by the first coil, and the fourth coil is at least partially enclosed by the second coil.

Another aspect disclosed herein is a method for receiving wireless power. The method comprises receiving power wirelessly from a magnetic field via a first coil enclosing a first area and a second coil enclosing a second area different than the first area, the second coil positioned to be at least partially coplanar with the first coil. The method also comprises receiving power wirelessly from the magnetic field via a third coil and a fourth coil each wound about a ferrite material, the third coil at least partially enclosed by the first coil and the fourth coil at least partially enclosed by the second coil. The method further comprises charging or powering a load with wirelessly received power.

An additional aspect disclosed herein comprises an apparatus for wireless power transfer. The apparatus comprises first means for transferring or receiving power wirelessly enclosing a first area and second means for transferring or receiving power wirelessly enclosing lose a second area different from the first area, the second transferring or receiving means positioned to be at least partially coplanar with the first transferring or receiving means. The apparatus further comprises means for varying a magnetic field. The apparatus also comprises third means for transferring or receiving power wirelessly and fourth means for transferring or receiving power wirelessly. The third and fourth transferring or receiving means are each wound about the varying means. The third transferring or receiving means is at least partially enclosed by the first transferring or receiving means and the fourth transferring or receiving means is at least partially enclosed by the second transferring or receiving means.

An additional aspect disclosed herein includes an apparatus for inductive power transfer that includes a double-D coil structure. The apparatus further includes a first solenoid coil and second solenoid coil each positioned at least partially within open areas defined by the double-D coil structure. In some aspects, the first and second solenoid coils are connected in a series opposing configuration. In some aspects the first and second solenoid coils are wrapped around ferromagnetic material that extends substantially from one side of the double-D coil configuration to another side of the double-D configuration.

DETAILED DESCRIPTION

Figure 1:
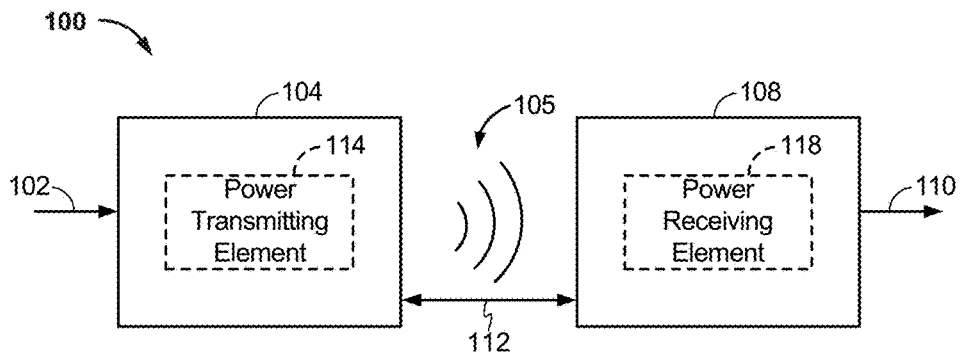
FIG. 1 is a functional block diagram of a wireless power transfer system, in accordance with some implementations.

In the following detailed description, reference is made to the accompanying drawings, which form a part of the present disclosure. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and form part of this disclosure.

Wireless power transfer may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field or an electromagnetic field) may be received, captured, or coupled by a "power receiving element" to achieve power transfer.

The terminology used herein is for the purpose of describing particular implementations only and is not intended to be limiting on the disclosure. It will be understood that if a specific number of a claim element is intended, such intent will be explicitly recited in the claim, and in the absence of such recitation, no such intent is present. For example, as used herein, the singular forms "a," "an" and "the" are intended to include the plural forms as well, unless the context clearly indicates otherwise. As used herein, the term "and/or" includes any and all combinations of one or more of the associated listed items. It will be further understood that the terms "comprises," "comprising," "includes," and "including," when used in this specification, specify the presence of stated features, integers, steps, operations, elements, and/or components, but do not preclude the presence or addition of one or more other features, integers, steps, operations, elements, components, and/or groups thereof. Expressions such as "at least one of," when preceding a list of elements, modify the entire list of elements and do not modify the individual elements of the list.

An electric vehicle is used herein to describe a remote system, an example of which is a vehicle that includes, as part of its locomotion capabilities, electrical power derived from a chargeable energy storage device (e.g., one or more rechargeable electrochemical cells or other type of battery). As non-limiting examples, some electric vehicles may be hybrid electric vehicles that include besides electric motors, a traditional combustion engine for direct locomotion or to charge the vehicle's battery. Other electric vehicles may draw all locomotion ability from electrical power. An electric vehicle is not limited to an automobile and may include motorcycles, carts, scooters, and the like. By way of example and not limitation, a remote system is described herein in the form of an electric vehicle (EV). Furthermore, other remote systems that may be at least partially powered using a chargeable energy storage device are also contemplated (e.g., electronic devices such as personal computing devices and the like).

FIG. 1 is a functional block diagram of a wireless power transfer system 100, in accordance with some exemplary implementations. Input power 102 may be provided to a transmitter 104 from a power source (not shown) to generate a wireless (e.g., magnetic or electromagnetic) field 105 via a power transmitting element 114 for performing energy transfer. The receiver 108 may receive power when the receiver 108 is located in the wireless field 105 produced by the transmitter 104. The wireless field 105 corresponds to a region where energy output by the transmitter 104 may be captured by the receiver 108. A receiver 108 may couple to the wireless field 105 and generate output power 110 for storing or consumption by a device (not shown in this figure) coupled to the output power 110. Both the transmitter 104 and the receiver 108 are separated by a distance 112.

In one example implementation, power is transferred inductively via a time-varying magnetic field generated by the power transmitting element 114. The transmitter 104 and the receiver 108 may further be configured according to a mutual resonant relationship. When the resonant frequency of the receiver 108 and the resonant frequency of the transmitter 104 are substantially the same or very close, transmission losses between the transmitter 104 and the receiver 108 are minimal. However, even when resonance between the transmitter 104 and 408 receiver 108 are not matched, energy may be transferred, although the efficiency may be reduced. For example, the efficiency may be less when resonance is not matched. Transfer of energy occurs by coupling energy from the wireless field 105 of the power transmitting element 114 to the power receiving element 118, residing in the vicinity of the wireless field 105, rather than propagating the energy from the power transmitting element 114 into free space. Resonant inductive coupling techniques may thus allow for improved efficiency and power transfer over various distances and with a variety of inductive power transfer element configurations.

In some implementations, the wireless field 105 corresponds to the "near-field" of the transmitter 104. The near-field may correspond to a region in which there are strong reactive fields resulting from the currents and charges in the power transmitting element 114 that minimally radiate power away from the power transmitting element 114. The near-field may correspond to a region that is within about one wavelength (or a fraction thereof) of the power transmitting element 114. Efficient energy transfer may occur by coupling a large portion of the energy in the wireless field 105 to the power receiving element 118 rather than propagating most of the energy in an electromagnetic wave to the far field. When positioned within the wireless field 105, a "coupling mode" may be developed between the power transmitting element 114 and the power receiving element 118.

Figure 2:
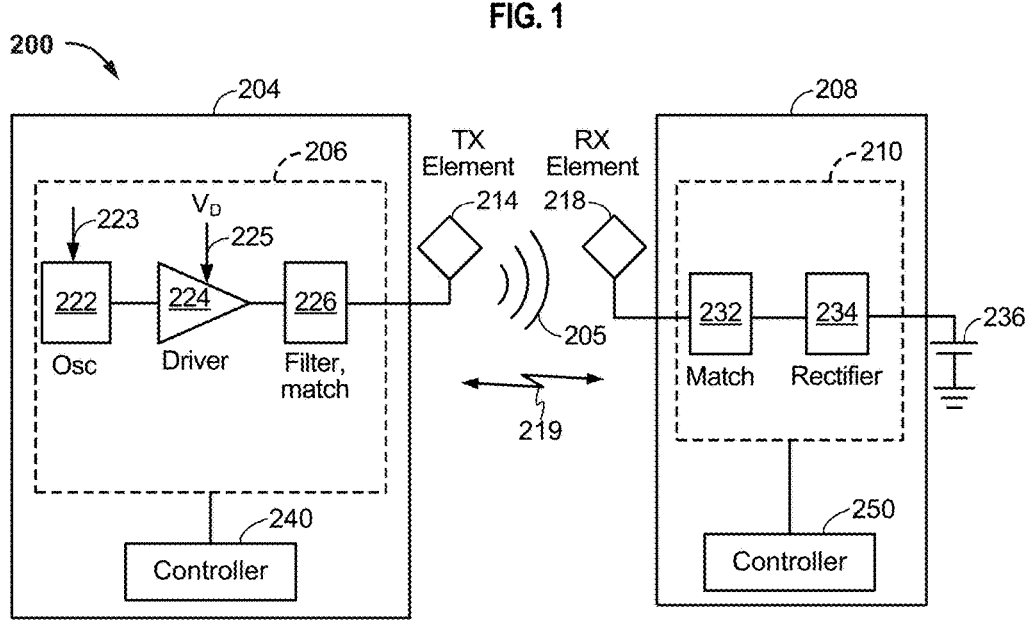
FIG. 2 is a functional block diagram of a wireless power transfer system, in accordance with some implementations.

FIG. 2 is a functional block diagram of a wireless power transfer system 200, in accordance with some other exemplary implementations. The system 200 may be a wireless power transfer system of similar operation and functionality as the system 100 of FIG. 1. However, the system 200 provides additional details regarding the components of the wireless power transfer system 200 as compared to FIG. 1. The system 200 includes a transmitter 204 and a receiver 208. The transmitter 204 includes transmit circuitry 206 that includes an oscillator circuit 222, a driver circuit 224, and a filter and matching circuit 226. The oscillator circuit 222 may be configured to generate a signal at a desired frequency that may be adjusted in response to a frequency control signal 223. The oscillator circuit 222 provides the oscillator signal to the driver circuit 224. The driver circuit 224 may be configured to drive the power transmitting element 214 at a resonant frequency of the power transmitting element 214 based on an input voltage signal (VD) 225. The driver circuit 224 may be a switching amplifier configured to receive a square wave from the oscillator 222 and output a sine wave.

The filter and matching circuit 226 filters out harmonics or other unwanted frequencies and matches the impedance of the transmit circuitry 206 to the power transmitting element 214. As a result of driving the power transmitting element 214, the power transmitting element 214 generates a wireless field 205 to wirelessly output power at a level sufficient for charging a battery 236 or otherwise powering a load.

The transmitter 204 further includes a controller circuit 240 operably coupled to the transmit circuitry 206 and configured to control one or more functions and operations of the transmit circuitry 206 or accomplish other operations relevant to managing a transfer of power. The controller 240 may be a micro-controller or a processor. The controller 240 may be implemented as an application-specific integrated circuit (ASIC). The controller 240 may be operably connected, directly or indirectly, to each component of the transmit circuitry 206. The controller 240 may be further configured to receive information from each of the components of the transmit circuitry 206 and perform calculations based on the received information. The controller 240 may be configured to generate control signals (e.g., signal 223) for each of the components that may adjust the operation of that component. As such, the controller 240 may be configured to adjust or manage the power transfer based on a result of the operations and/or calculations performed by the controller 240. The transmitter 204 may further include a memory (not shown) configured to store data, for example, such as instructions for causing the controller 240 to perform particular functions, such as those related to management of wireless power transfer.

The receiver 208 comprises receive circuitry 210 that includes a matching circuit 232 and a rectifier circuit 234. The matching circuit 232 may match the impedance of the receive circuitry 210 to the impedance of the power receiving element 218. The rectifier circuit 234 may generate a direct current (DC) power output from an alternate current (AC) power input to charge the battery 236. The receiver 208 and the transmitter 204 may additionally communicate on a separate communication channel 219 (e.g., Bluetooth, Zigbee, cellular, etc.). The receiver 208 and the transmitter 204 may alternatively communicate via in-band signaling using characteristics of the wireless field 205. In some implementations, the receiver 208 may be configured to determine whether an amount of power transmitted by the transmitter 204 and received by the receiver 208 is appropriate for charging the battery 236. Receiver 208 may directly couple to the wireless field 205 and may generate an output power for storing or consumption by a battery (or load) 236 coupled to the output or receive circuitry 210.

The receiver 208 may further include a controller circuit 250 configured similarly to the transmit controller 240 as described above for managing one or more functions and operations of the wireless power receiver. The receiver 208 may further include a memory (not shown) configured to store data, for example, such as instructions for causing the controller 250 to perform particular functions, such as those related to management of wireless power transfer.

Figure 3:
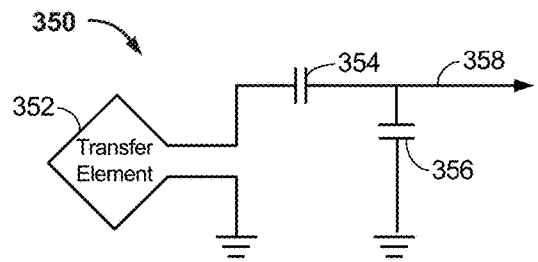
FIG. 3 is a schematic diagram of a portion of transmit circuitry or receive circuitry of FIG. 2 including a transmit or receive coil, in accordance with some implementations.

FIG. 3 is a schematic diagram of a portion of the transmit circuitry 206 or the receive circuitry 210 of FIG. 2, in accordance with some exemplary implementations. As illustrated in FIG. 3, transmit or receive circuitry 350 may include a power transfer element or 352. The power transfer element 352 may also be referred to or be configured as a "conductor or conductive loop", a "coil", an "inductor", an "antenna", or a "magnetic coupler". The term "power transfer element" generally refers to a component that may wirelessly output or receive energy for coupling to another "power transfer element."

The resonant frequency of the loop or magnetic power transfer elements is based on the inductance and capacitance of the loop or magnetic power transfer element. Inductance may be simply the inductance created by the power transfer element 352, whereas, capacitance may be added via a capacitor (or the self-capacitance of the power transfer element 352) to create a resonant structure at a desired resonant frequency. As a non-limiting example, a capacitor 354 and a capacitor 356 may be added to the transmit or receive circuitry 350 to create a resonant circuit that resonates at a resonant frequency. For power transmitting element, the signal 358, with a frequency that substantially corresponds to the resonant frequency of the power transmitting element 352, may be an input to the power transmitting element 352. For power receiving elements, the signal 358 may be an output to power or charge a load.

Figure 4:
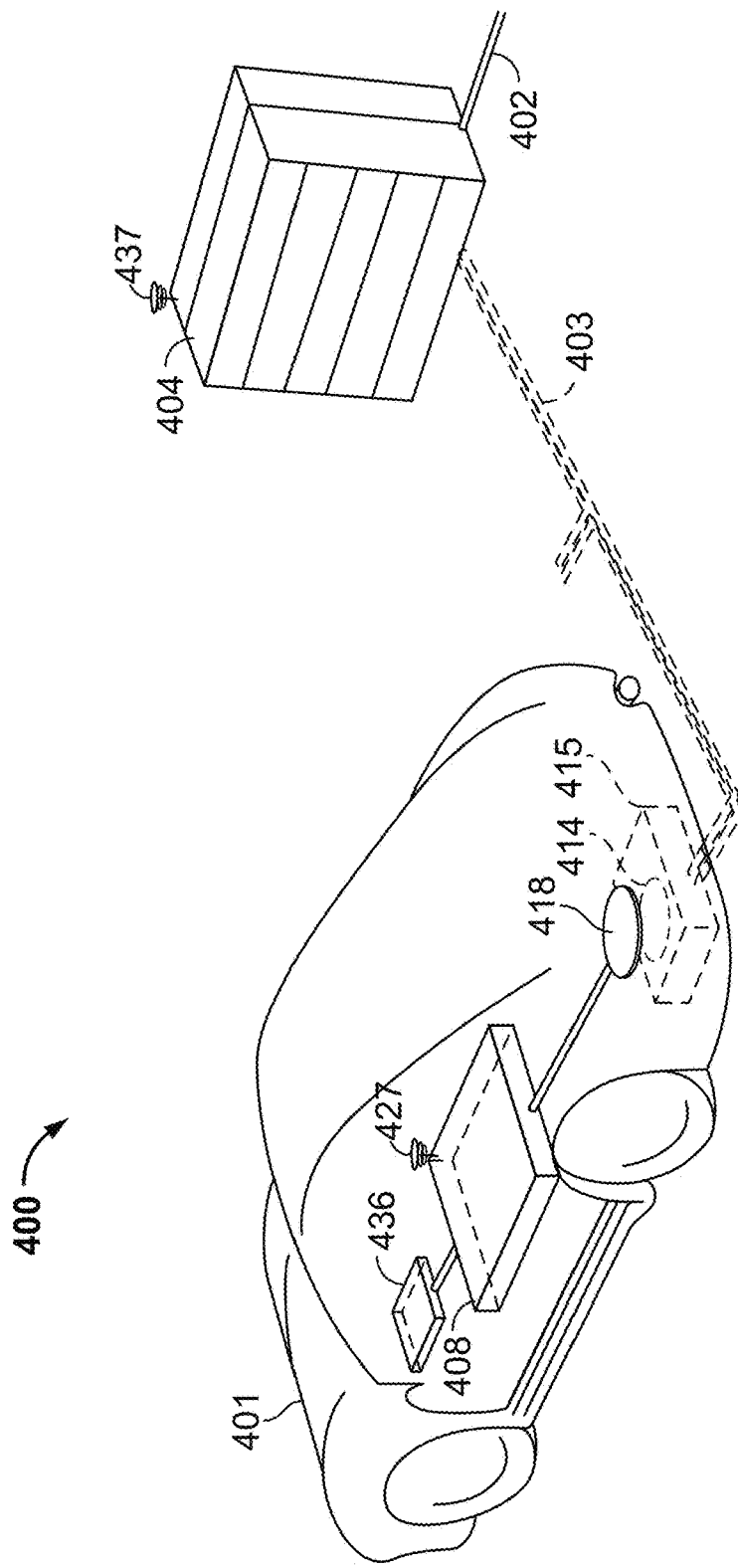
FIG. 4 is a diagram of an exemplary wireless power transfer system for charging an electric vehicle, in accordance with some implementations.

FIG. 4 is a diagram of an electrically chargeable vehicle 401 aligned over a wireless power transmitting element 414, in accordance with some implementations. The wireless power transfer system 400 enables charging of the vehicle 401 while the vehicle 401 is parked near the transmitter 404. Space is shown for the vehicle 401 to be parked over the power transmitting element 414. The power transmitting element 414 may be located within a base pad 415. In some implementations, the transmitter 404 may be connected to a power backbone 402. The transmitter 404 may be configured to provide an alternating current (AC), through an electrical connection 403, to the power transmitting element 414 located within the base pad 415. The vehicle 401 may include a battery 436, a power receiving element 418, and an antenna 427 each connected to the receiver 408.

In some implementations, the power receiving element 418 may receive power when the power receiving element 418 is located in a wireless (e.g., magnetic or electromagnetic) field produced by the power transmitting element 414. The wireless field corresponds to a region where energy output by the power transmitting element 414 may be captured by the power receiving element 418. In some cases, the wireless field may correspond to the "near field" of the power transmitting element 414.

It is desirable that the power receiving element 418 provides at least some minimum rated power to the receiver 408 in order to efficiently charge the battery 436 or power the vehicle 401. The minimum rated power may include additional electrical load requirements in addition to charging the battery 436, for example, any electrical requirements of one or more electronic devices within and powered by the vehicle 401.

In some embodiments, power receiving elements may be unable to efficiently and effectively couple to both vertically polarized and horizontally polarized power transmitting elements. For example, a vertically polarized power transmitting element may generate a flux that is mostly in a vertical direction at the center of the power receiving element, while a horizontally polarized power transmitting element may generate a flux that is mostly in the horizontal direction at the center of the power receiving element. Thus, power receiving elements that are only able to couple to flux of a single direction may be inoperable or have reduced power transfer efficiency in relation to all types of power transmitting elements.

In some embodiments, the vertical direction of flux from a power transmitting element may be described as a first component of a magnetic field generated by the power transmitting element. Similarly, a second component of the magnetic field may correspond to a horizontal direction of flux from the power transmitting element. Thus, the direction of flow of flux (horizontal or vertical) may define or correspond to horizontal or vertical flux components of the magnetic field.

Accordingly, power receiving elements that couple with both vertically and horizontally polarized power transmitting elements may enable interoperability with various configurations and types of power transmitting elements. Such power receiving elements may also improve tolerance of horizontal misalignment between the power receiving and transmitting elements, regardless of configuration, where the horizontal misalignment may impact polarization direction at the power receiving element.

Figure 5A:
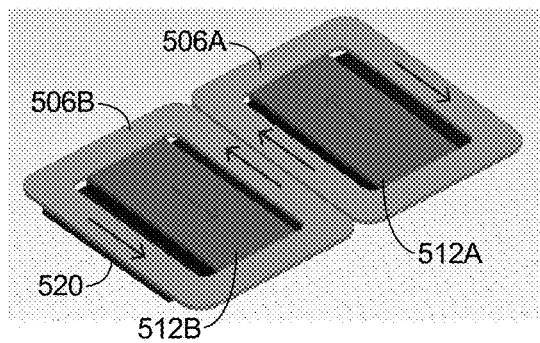
FIG. 5A shows a perspective view of a rendering of a double-D coil combined with two solenoid coils.

FIG. 5A shows a perspective view of a double-D (DD) coil combined with two solenoid coils to create a DD-solenoid coil 500. In some embodiments, the DD coil may correspond to one of the power transmitting or receiving elements described in relation to FIGS. 1-4. In some embodiments, the solenoid coils may correspond to one of the power transmitting or receiving elements described in relation to FIGS. 1-4. The DD coil may comprise two sets of loops, each set of loops having a shape conforming to or similar to a "D" as formed by a conductor forming the set of loops. The solenoid coil may comprise a coil structure that wraps around a core (e.g., a ferrite core), where the coil structure is formed from a conductor one or more loops) that forms one or more loops around the core.

The DD-solenoid coil 500 comprises two substantially coplanar DD coils 506A and 506B positioned in a substantially adjacent fashion. The DD coils 506A and 506B are wound such that the currents flowing through each of the DD coils 506A and 506B flow in opposite directions. Each of the DD coils 506A and 506B may have a "pole" within the opening formed by each of the DD coils 506A and 506B along which flux from may flow. Given that the DD coils 506A and 506B are wound such that their current flows are in opposite directions, the currents flowing through adjacent legs of the DD coils 506A and 506B are flowing in the same direction. Accordingly, flux may travel vertically up the pole of the D coil 506A, travel horizontally across the adjacent legs from the DD coils 506A and 506B before traveling vertically down the pole of the D coil 506B. Since the adjacent legs of the DD coils 506A and 506B comprise currents flowing in the same direction, the flux generates currents in each of the DD coils 506A and 506B that sum instead of cancel (e.g., when the DD coils 506A and 506B are operating as receiving coils).

Within the opening of the DD coil 506A is a solenoid coil 512A and within the opening of the DD coil 506B is a solenoid coil 512B. As shown, the solenoid coils 512A and 512B wind about a ferrite material 520. In some embodiments, the ferrite material may be formed from one or more separate pieces or blocks of ferrite material. When formed from separate pieces, the pieces may be placed (with or without a gap between adjacent pieces) to form the ferrite material 520. The solenoid coils 512A and 512B are substantially coplanar. As shown, the solenoid coils 512A and 512B are coaxial with the DD coils 506A and 506B. As shown, each DD coil 506A and 506B winds about an axis that is perpendicular or orthogonal to a plane of the solenoid coils 512A and 512B (e.g., a plane in a direction of travel of the DD-solenoid coil 500) within its respective opening.

In some embodiments, though DD coils and solenoid coils are described herein, the DD coils 506 may be replaced with any pair of coplanar coils positioned to encompass different, non-overlapping areas of the plane (regardless of shape and number of coils making each of the coplanar coils). Similarly, the solenoid coils 512 may be replaced with a pair of coaxially aligned coil structures (each coil structure comprising any number of coils in a coaxial alignment), each pair of coil structures wrapping or winding around a core (e.g., a ferrite core). For example, the DD-solenoid coil 500 may be replaced with a combined structure comprising a pair of coplanar coils (e.g., coils that are not in a "DD" shape) and a core having the pair of coil structures coaxially aligned around the core about which the individual coils are wrapped or wound.

The DD-solenoid coil 500 may be configured to wirelessly receive power from a base coil (e.g., primary side) to power or charge a load, for example a battery of an electric vehicle. As described above, the DD-solenoid coil 500 may wirelessly receive power from a wireless field generated by a base pad transmitter (not shown). Each of the DD coils 506A and 506B and each of the solenoid coils 512A and 512B may each couple to and induce a current when exposed to the wireless field. As shown, the current induced in the DD coil 506A flows in a clockwise direction, while the current induced in the DD coil 506B flows in a counterclockwise direction. The DD-solenoid coil 500 may include the combined benefits of the DD coils 506A and 506B and the solenoid coils 512A and 512B in a single footprint, thus making the DD-solenoid coil 500 more efficient and effective at wirelessly receiving power. In some implementations, the solenoid coils 512A and 512B may not be coplanar with each other, but rather coaxial with each other. In some implementations, the solenoid coils 512A and 512B may be neither coplanar nor coaxial with each other or one or more portions of the solenoid coil 512A may be coplanar with one or more portions of the solenoid coil 512B. In some implementations, the solenoid coils 512A and 512B may be coplanar and/or not coaxial with the DD coils 506A and 506B. In some other implementations, one or more portions of the solenoid coils 512A and 512B may be coplanar with one or more portions of the DD coils 506A and 506B, respectively.

In some implementations, the solenoid coils 512A and 512B may not be positioned within the openings of the DD coils 506A and 506B, respectively. Instead, the solenoid coils 512A and 512B may be positioned outside of or overlapping the DD coils 506A and 506B, respectively. The solenoid coils 512A and 512B may wind about the core 520 in opposite directions or in the same direction, as will be discussed below. In some implementations, the solenoid coils 512A and 512B may be positioned such that they are electrically symmetrical in relation to the DD coils 506A and 506B. Electrically symmetrical solenoid coils 512A and 512B are electrically symmetrical in relation to the DD coils 506A and 506B. Accordingly, each of the solenoid coils 512A and 512B have equal but opposing impacts on the DD coils 506A and 506B, respectively, when viewed independently. In some implementations, the solenoid coils 512A and 512B and the DD coils 506A and 506B may not be symmetric, physically or electrically. For example, a large solenoid coil 512A and a small DD coil 506A may balance a large D coil 506B and a small solenoid coil 512B. Alternatively, or additionally, solenoid coils 512A and 512B may be positioned within the respective DD coil 506A and 506B but not in a geometric center of the respective DD coil 506A and 506B.

Figure 5B:
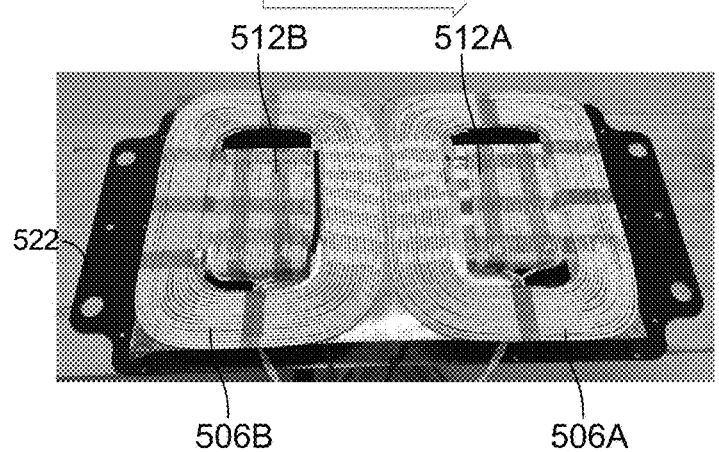
FIG. 5B shows an overhead view of the rendered DD-solenoid coil of FIG. 5A.

FIG. 5B shows an overhead view of the DD-solenoid coil 500 of FIG. 5A. FIG. 5B shows a direction of travel of the DD-solenoid coil 500 (e.g., direction of travel of a vehicle on which the DD-solenoid coils 500 is installed or mounted) in relation to the DD-solenoid coil 500. As shown, the direction of travel is from left to right along the length of the DD-solenoid coil 500. FIG. 5A also shows the individual windings of each of the DD coils 506A and 506B and each of the solenoid coils 512A and 512B. As shown, the windings of each of the DD coils 506A and 506B generally form a large "D"-like shape. A conductor (e.g., could be implemented by litz wire or other conductors) forms the DD coil 506B in a large rectangular shape, starting from the inside of the DD coil 506B and forming the coil by winding in a clockwise direction. The conductor then completes the DD coil 506B before forming the DD coil 506A from the outside of the coil in, this time in a counterclockwise direction. Thus, the current flow through each of the DD coils 506A and 506B is in "opposite" directions. A separate conductor forms the solenoid coils 512A and 512B. The separate conductor forming the solenoid coils 512A and 512B winds about the core 520 in a direction perpendicular to the direction of travel. In some embodiments, a single conductor may form both of the solenoid coils 512A and 512B. FIG. 5B also shows a vehicle pad backplate or mounting plate 522, on which the DD-solenoid coil 500 may mount. The backplate 522 may be configured to attach or mount to a bottom edge or side of a vehicle via the holes shown.

The backplate 522 may shield an electric vehicle chassis (not shown) from magnetic field(s) about the coils of the DD-solenoid coil 500. In some implementations, the backplate 522 may be a nonmagnetic material that is a good conductor (e.g., aluminum or copper). The backplate 522 may be used to mount the DD-solenoid coil 500 to the electric vehicle. In some implementations, the backplate 522 may form a portion of an enclosure of the DD-solenoid coil, where a portion of the enclosure is plastic with an aluminum sheet of adequate thickness embedded therein.

Figure 5C:
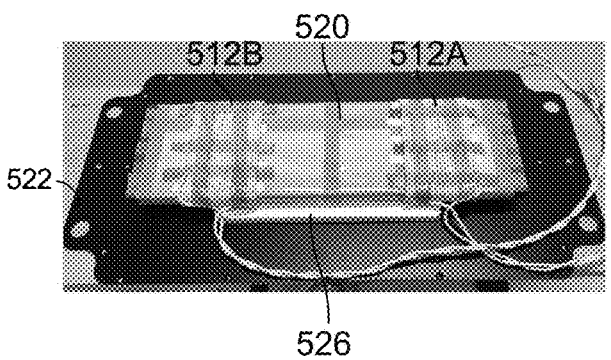
FIG. 5C shows an overhead view of the solenoid coils of the DD-solenoid coil of FIGS. 5A and 5B.

FIG. 5C shows an overhead view of the solenoid coils 512A and 512B of the DD-solenoid coil 500 of FIGS. 5A and 5B. As shown in FIG. 5C, a separate conductor may form each of the solenoid coils 512A and 512B, unlike the solenoid coils 512A and 512B as discussed in relation to FIG. 5B. The core 520 is shown as a single, continuous core shared by both the solenoid coils 512A and 512B. A spacer 526 is also shown below the core 520 and the solenoid coils 512A and 512B and above the backplate 522. The spacer 536 may keep the DD-solenoid coil 500 a small distance away from the backplate 522. Such spacing may reduce eddy current losses in the backplate 522. In some implementations, isolated and separate core portions (not shown in this figure) may serve as the core 520 for each of the solenoid coils 512A and 512B.

The DD coils 506A and 506B and the solenoid coils 512A and 512B couple with and transfer power from the wireless field generated by the base pad. The DD-solenoid coil 500 provides increased coupling with and power transfer from the wireless field compared to use of the DD coils 506A and the 506B independent from the solenoid coils 512A and 512B. In some implementations, the DD-solenoid coil 500 may provide wireless power transfer in dynamic vehicle charging systems. In such dynamic vehicle charging systems, the DD-solenoid coil 500 may function as the receive coupler (e.g., the power receiving element 118 of FIG. 1) of an electric vehicle configured to wirelessly receive charging power via the dynamic vehicle charging system. Accordingly, the DD-solenoid coil 500 may travel in the noted "direction of travel" of FIG. 5A when dynamically charging. The DD coils 506A and 506B, while functioning as part of the receive coupler with the solenoid coils 512A and 512B, are mutually decoupled from and function independently of the solenoid coils 512A and 512B. Alternatively, or additionally, the DD-solenoid coil 500 may be used in a stationary vehicle charging system, though its functions may be substantially the same as those discussed above.

Figure 6A:
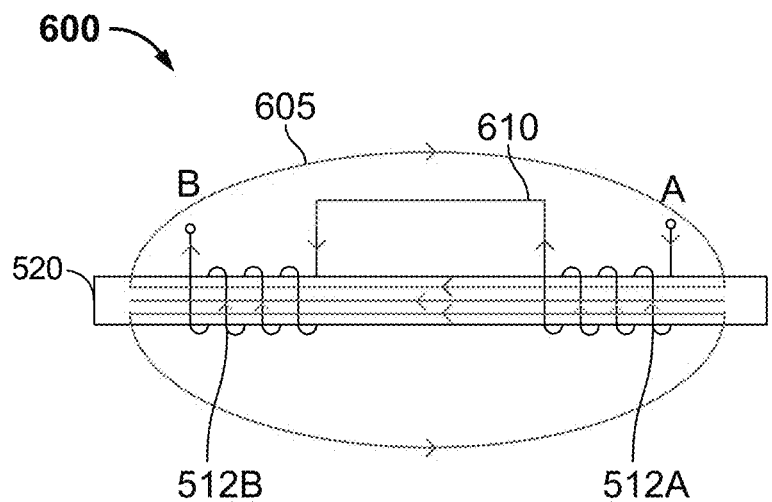
FIGS. 6A and 6B each show a side view of current and flux flow diagrams of two variations of connecting two separate solenoid coils for use in the DD-solenoid coil of FIGS. 5A-5C.
Figure 6B:
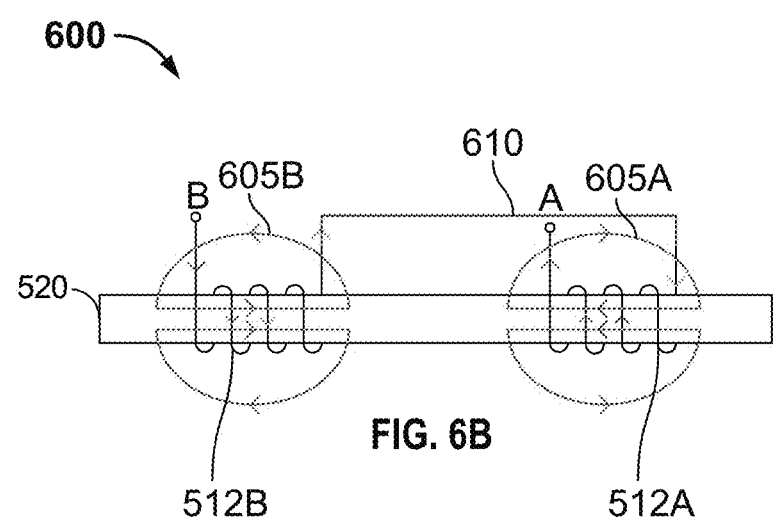

FIGS. 6A and 6B each show a side view of current and flux flow diagrams of two variations of connecting two separate solenoid coils for use in the DD-solenoid coil 500 of FIGS. 5A-5C. FIGS. 6A and 6B each show a solenoid coil system 600 comprising the solenoid coils 512A and 512B wound about the core 520. As shown, the core 520 is a single core shared by both the solenoid coils 512a and 512B.

FIG. 6A shows the solenoid coils 512A and 512B coupled together by a segment 610. In some implementations, segment 610 may comprise to a conductor that couples the two solenoid coils 512A and 512B together when a separate conductor forms each of the two solenoid coils 512A and 512B. In some implementations, the segment 610 may correspond to a terminal location at which the separate conductors forming each of the solenoid coils 512A and 512B couple. Where a single conductor forms both of the solenoid coils 512A and 512B, the segment 610 may represent a portion of the conductor that is between the windings for the individual solenoid coils 512A and 512B. FIG. 6A shows that the current flows through the solenoid coil system 600 from point A at the right end of the solenoid coil 512A to the left end of the solenoid coil 512A in a clockwise direction around the core 520. The current then flows through the segment 610 and through the solenoid coil 512B from the right end of the solenoid coil 512B to point B at the left end of the solenoid coil 512B, also in a clockwise direction around the core 520. The points A and B may correspond to locations where the solenoid coil system 600 couples with the receiver circuit, e.g., the receiver 108 of FIG. 1 or the receive circuitry 210 of FIG. 2.

As the current flows through each of the coupled solenoid coils 512A and 512B in the same direction, the solenoid coils 512A and 512B are said to be in a series aiding (SA) configuration. Accordingly, a flux generated by each of the two solenoid coils 512A and 512B may be directly proportional to a measured inductance of each of the solenoid coils 512A and 512 and reinforces or aids inductance, forming a combined flux 605. Table 1 below shows inductance measurements of the solenoid coils 512A and 512B and the DD coils 506A and 506B. The inductance measurements of Table 1 indicate that coupling the solenoid coils 512A and 512B in SA configurations of FIG. 6A, creates coupling between the solenoid coils 512A and 512B and the DD coils 506A and 506B in the DD-solenoid coil 500. The coupling between the solenoid coils 512A and 512B and the DD coils 506A and 506B of the DD-solenoid coil 500 may be verified by shorting either the solenoid coils 512A and 512B or the DD coils 506A and 506B. In the SA configuration, shorting the solenoid coils 512A and 512B changes the inductance and, hence, the flux generated by the DD coils 506A and 506B, and vice versa, as detailed in Table 1.

TABLE 1

| Measured Flux (µH) | When no coil type is shorted | When other coil type is shorted |
|---|---|---|
| Solenoid Coils 512 | 424 | 367 |
| DD Coils 506 | 305 | 264 |

As shown in Table 1, without shorting any coil of the DD-solenoid coil 500, the measured flux of the solenoid coils 512A and 512B is 424 µH. However, shorting the DD coils 506A and 506B causes the measured flux of the solenoid coils 512A and 512B to be 367 µH. The fact that the measured flux varies when shorting the other coil type suggests that there is coupling between the solenoid coils 512A and 512B and the DD coils 506A and 506B. The same can be said of the relationship between the measured flux of the DD coils 506A and 506B when shorting solenoid coils 512A and 512B as compared to the measured flux of the DD coils 506A and 506B when not shorting the solenoid coils 512A and 512B.

FIG. 6B, similar to FIG. 6A, also shows the solenoid coils 512A and 512B coupled together by the segment 610. FIG. 6B shows that the current flow through the solenoid coil system 600 flows from point B on the left end of the solenoid coil 512B to the right end of the solenoid coil 512B in a clockwise direction about the core 520. The current then flows through the segment 610 and through the solenoid coil 512A, this time from the right end of the solenoid coil 512A to the point B at the left end of the solenoid coil 512A, now in a counterclockwise direction (from the perspective of solenoid coil 512B current flow), before reaching point A. The points A and B may correspond to locations where the solenoid coil system 600 couples with the receiver circuit, e.g., the receiver 108 of FIG. 1 or the receive circuitry 210 of FIG. 2.

In FIG. 6B, as the current flow through each of the coupled solenoid coils 512A and 512B is in opposite directions, the solenoid coils 512A and 512B are said to be in a series opposing (SO) configuration. Accordingly, a flux generated by each of the two solenoid coils 512A and 512B cancels. Accordingly, FIG. 6B shows a flux 605A and a flux 605B, each of the flux 605A and 605 surrounding the solenoid coils 512A and 512B, respectively. The flux 605A is in an opposite direction of the flux 605B. Table 2 below shows inductance measurements of the solenoid coils 512A and 512B and the DD coils 506A and 506B. The inductance measurements of Table 2 indicate that coupling the solenoid coils 512A and 512B in series opposing configurations of FIG. 6B does not create coupling between the solenoid coils 512A and 512B and the DD coils 506A and 506B in the DD-solenoid coil 500. The lack of coupling between the solenoid coils 512A and 512B and the DD coils 506A and 506B of the DD-solenoid coil 500 may be verified by shorting either the solenoid coils 512A and 512B or the DD coils 506A and 506B. In the series opposing configuration, shorting the solenoid coils 512A and 512B does not change the flux generated by the DD coils 506A and 506B, and vice versa, as detailed in Table 2.

TABLE 2

| Measured Flux (µH) | When no coil type is shorted | When other coil type is shorted |
|---|---|---|
| Solenoid Coils 512 | 230 | 229 |
| DD Coils 506 | 304 | 305 |

As shown in Table 2, without shorting any coil of the DD-solenoid coil 500, the measured flux of the solenoid coils 512A and 512B is 230 µH. However, when shorting the DD coils 506A and 506B, the measured flux of the solenoid coils 512A and 512B is 229 µH. The fact that the measured flux varies so little when shorting the other coil type suggests that there is minimal coupling between the solenoid coils 512A and 512B and the DD coils 506A and 506B. The same can be said of the relationship between the measured flux of the DD coils 506A and 506B when shorting solenoid coils 512A and 512B as compared to the measured flux of the DD coils 506A and 506B when not shorting the solenoid coils 512A and 512B. By reducing mutual coupling between the solenoid coils 512 and the DD coils 506, the flux received by each of the types of coils may not adversely impact the flux received by the other type of coil. For example, the flux received by the solenoid coils 512 may not serve to reduce the flux received by the DD coils 506, and vice versa.

Figure 7A:
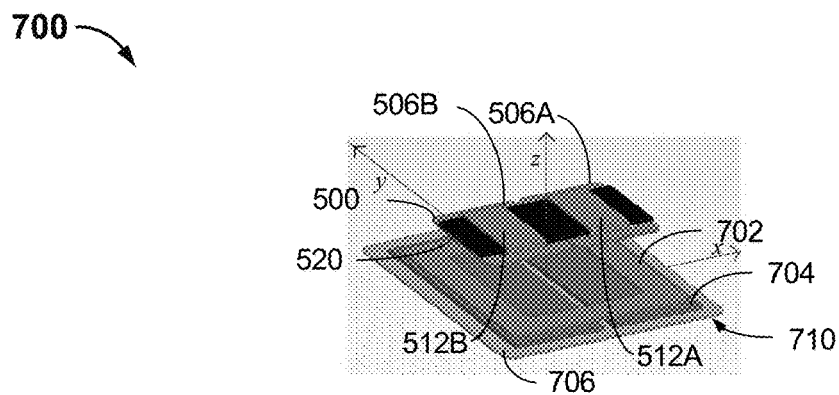
FIG. 7A shows a perspective view of a wireless power transfer system comprising the DD-solenoid coil of FIG. 5A centered above a base pad.

FIG. 7A shows a perspective view of a wireless power transfer system comprising the DD-solenoid coil 500 of FIG. 5A centered above a base pad 710. The wireless power transfer base pad 710 shows the DD-solenoid coil 500 centered at a distance above the base pad 710. The system 700 includes a coil 702, a ferrite base 704, and a shield 706. The coil 702, as shown, is centered on the shield 706 and spans two pieces of the ferrite base 704. In some implementations, the solenoid coils 512A and 512B are identical and symmetrically placed in relation to the DD coils 506A and 506B. In some implementations, the solenoid coils 512A and 512B may not be identical or symmetrically placed in relation to the DD coils 506A and 506B. In some implementations, the symmetry may be measured physically (i.e., located such that their positions are symmetric with the positions of the DD coils 506A and 506B) or electrically (i.e., positioned such that their electrical effect on the DD-solenoid coil 500 is net zero).

The base pad 710 may be configured to function as a wireless power transmitter. Accordingly, the base pad 710 may be configured to generate a wireless field and the DD-solenoid coil 500 may be configured to couple with the wireless field and receive wireless power from the base pad 710 via the wireless field. In operation, the base pad 710 may be vertically polarized. Accordingly, the wireless field generated by the base pad 710 may enter the center of the ferrite of the DD-solenoid coil 500 and travel outward. Thus, flux of the wireless field generated by the base pad 710 may flow through the solenoid coils 512A and 512B in opposite directions. As will be described in further detail below, the placement of the solenoid coils 512A and 512B within the openings of DD coils 506A and 506B, respectively, may provide for increased power transfer capabilities of the DD-solenoid coil 500.

Figure 7B:
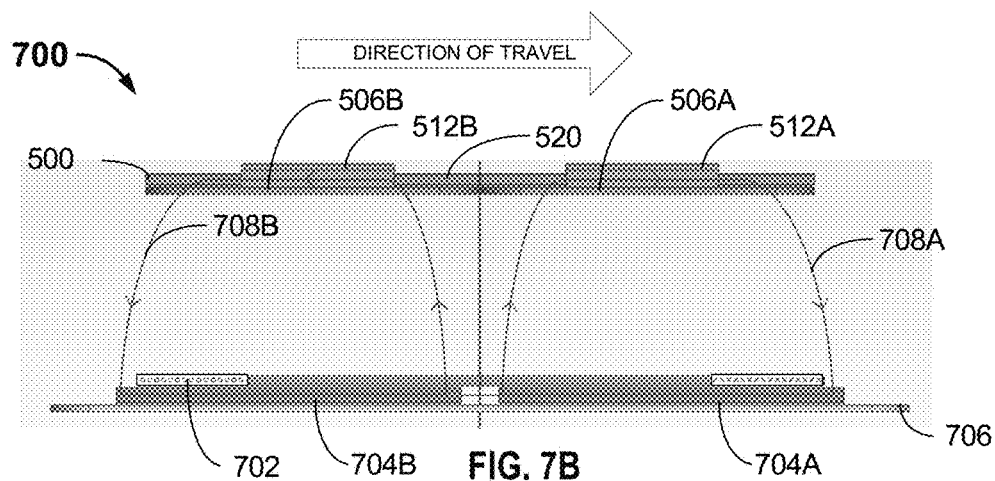
FIG. 7B shows a side view of the system of FIG. 7A comprising the DD-solenoid coil of FIG. 5A centered above the base pad of FIG. 7A.

FIG. 7B shows a horizontal view of system 700 of FIG. 7A comprising the DD-solenoid coil 500 of FIG. 5A centered above the base pad 710. The wireless power transfer system 700 also shows wireless field components 708A and 708B of the wireless field generated by the coil 702. The coil 702 may generate the wireless fields 708A and 708B from the two legs of the coil 702 that extend into and out from the page, respectively. The flux of the wireless field (e.g., flux 708A), as shown, flows substantially horizontally through the ferrite base 704A before flowing substantially vertically to the DD-solenoid coil 500. The flux 708A then flows substantially horizontally through the solenoid coil 512A, before flowing vertically back to the ferrite base 704A. However, because the flux of the wireless field 708A is vertical at the DD coil 506A, the flux 708A does not flow horizontally through the DD coil 506A, instead flowing substantially horizontally through the opening between the legs of the DD coil 506A. As shown, the flux 708A flows in a clockwise direction through the components described above.

Similarly, the flux of the wireless field (e.g., flux 708B) flows substantially horizontally through the ferrite base 704B before flowing substantially vertically to the DD-solenoid coil 500, where the flux 708B flows substantially horizontally through the solenoid coil 512B. The flux 708B then flows substantially vertically back to the ferrite base 704B. However, similar to the wireless field 708A described above, the flux 708B does not flow horizontally through the DD coil 506B, instead flowing substantially horizontally through the opening between the legs of the DD coil 506B. Thus, the flux 708B flows in a counterclockwise direction through the components described above.

In the wireless power transfer system 700, the coil 702 may be configured to generate both the wireless fields 708A and 708B from the legs of the coil 702 that extend into and out from the page. The wireless fields 708A and 708B are generated by current flow through the coil 702. The ferrite bases 704A and 704B may direct the wireless fields 708A and 708B. The direction of the wireless fields 708A and 708B may be determined by the direction of current flow through the coil 702. For the leg of the coil 702 that extends outward from the page, the current flows out of the page. Thus, the direction of the wireless field 708B is counterclockwise, as discussed above. Accordingly, for the leg of the coil 702 that flows into the page, the direction of the current flow is into the page, thus causing the wireless field 708A to be clockwise.

As the flux 708A and the flux 708B flow around and through conductive objects (e.g., the solenoid coils 512A and 512B or the DD coils 506A and 506B), the wireless fields 708A and 708B may induce a voltage within the conductive objects. This induced voltage may cause a current to flow in the conductive objects.

As described above, the flux 708A and the flux 708B flow through the solenoid coils 512A and 512B, respectively, in opposite directions. Accordingly, the voltages induced in each of the solenoid coils 512A and 512B may be of opposite sign. However, as the solenoid coils 512A and 512B are coupled together in the series opposing configuration, the opposing voltages induced in the solenoid coils 512A and 512B sum. Thus, the solenoid coils 512A and 512B may experience a peak level of coupling when the DD-solenoid coil 500 is positioned above the base pad 710 such that the wireless field generated by the coil 702 travels through the solenoid coils 512A and 512B in opposite directions.

At this position, the DD coils 506A and 506B may not couple with the wireless field generated by the coil 702. This may be because the wireless fields 708A and 708B do not travel through the DD coils 506A and 506B, but rather only through the openings within the DD coils 506A and 506B. The wireless fields 708A and 708B may not induce measureable voltages within the DD coils 506A and 506B. Thus, the DD coils 506A and 506B may experience a minimal level of coupling when the DD-solenoid coil 500 is positioned above the base pad 710 such that the wireless field generated by the coil 702 does not travel as much through the DD coils 506A and 506B.

Accordingly, the DD coils 506A and 506B of the DD-solenoid coil 500 enable the DD-solenoid coil 500 to engage in the wireless power transfer when the solenoid coils 512A and 512B are not as strongly coupled to the wireless field 708. Additionally, the addition of the solenoid coils 512A and 512B for the benefit of the position depicted in FIGS. 7B and 7C do not reduce the capabilities of the DD coils 506A and 506B in the positions depicted in FIGS. 7D and 7E below. Thus, the solenoid coils 512A and 512B increase the usable range of the DD-solenoid coil 500 as compared to only a DD coil.

Figure 7C:
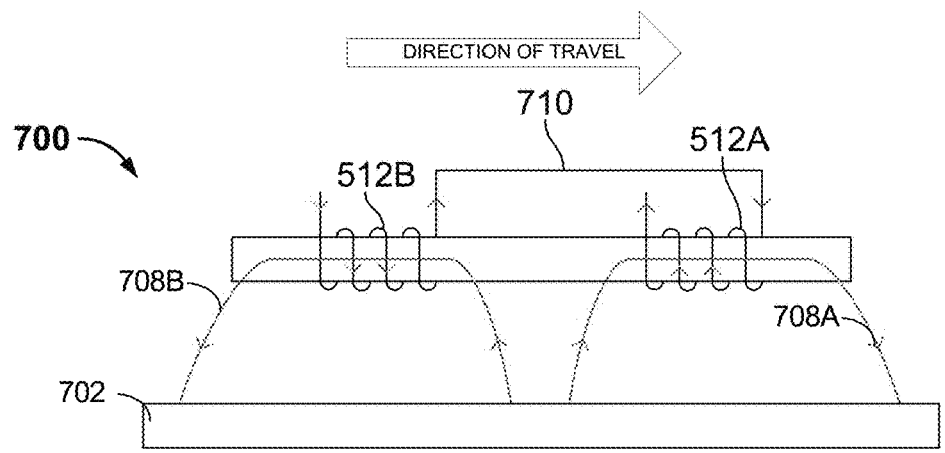
FIG. 7C shows a side view of a current and flux flow diagram of the system of FIG. 7A comprising the DD-solenoid coil and the base pad of FIGS. 7A-7B.

FIG. 7C shows a side view current and flux flow diagram of the system of FIG. 7A comprising the DD-solenoid coil 500 and base pad 710. As discussed above, the flux 708A and the flux 708B flow through the solenoid coils 512A and 512B, respectively, in opposite directions. Accordingly, the currents generated in the solenoid coils 512A and 512B based on the voltages induced by the wireless fields 708A and 708B, respectively, are in opposite directions. The current flow in solenoid coil 512A generated based on the flux 708A flows from the right end to the left end of the solenoid coil 512A. The current flow in the solenoid coil 512B, generated based on the flux 708B, flows from the left end to the right end of the solenoid coil 512B. However, since the segment 610 couples the solenoid coils 512A and 512 in the series opposing configuration, the generated currents (and induced voltages) actually sum, as shown by the current flow direction arrows shown in FIG. 7C. Alternatively, if the solenoid coils 512A and 512B were coupled in the SA configuration (FIG. 6A), the opposite directions of the currents would cause the generated currents (and induced voltages) to actually cancel.

Figure 7D:
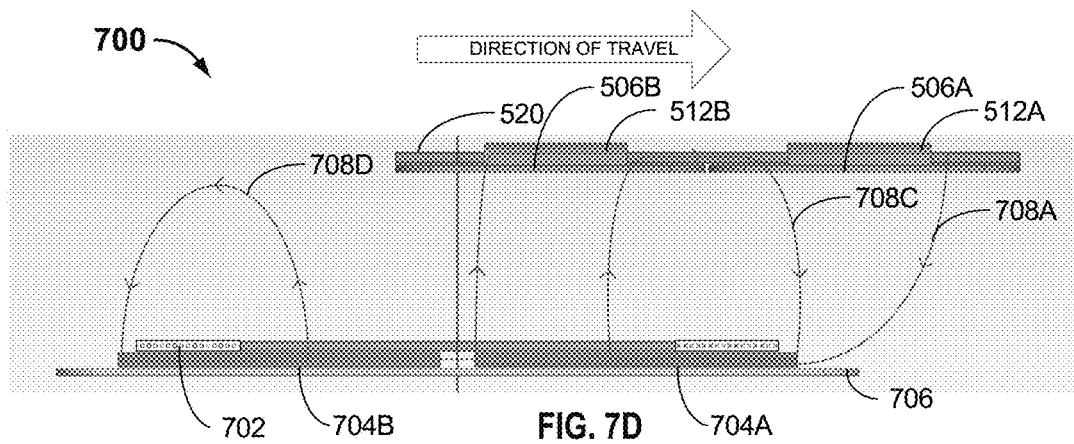
FIG. 7D shows another side view of the system of FIG. 7A comprising the DD-solenoid coil of FIG. 5A in an offset position above the base pad of FIGS. 7A-7C.

FIG. 7D shows a horizontal view of the system 700 of FIG. 7A comprising the DD-solenoid coil 500 of FIG. 5A in an offset position above the base pad 710. Compared to FIGS. 7A-7C described above, the DD-solenoid coil 500 is positioned offset in the x-axis in relation to the base pad 710. As shown in the system 700, the flux 708A flows in a clockwise direction substantially horizontally through the ferrite base 704A and substantially vertically to the DD-solenoid coil 500. The flux 708A then flows substantially horizontally through the core 520 of the DD-solenoid coil 500 before flowing substantially vertically to the ferrite base 704A. Because ferrite attracts magnetic flux, wireless field paths (e.g., flow patterns) vary depending on positions of the core 520 of the DD-solenoid coil 500. For example, in FIGS. 7A-7C described herein, the wireless fields 708A and 708B may be identical and symmetric and may be considered useful fields about the coil 702 because they couple with the DD-solenoid coil 500 and transfer power. However, in FIG. 7D, the wireless field 708D no longer couples to any secondary (receiver) coil and is therefore different from the wireless fields 708A and 708B. As shown, the wireless field 708A now travels a longer path through the core 520 while the wireless field 708C only travels through both D coils.

As shown, the flux 708A flows through both of the solenoid coils 612A and 612B in the same (clockwise) direction. As the flux 708A flows around and through conductive objects (e.g., the solenoid coils 512A and 512B and/or the DD coils 506A and 506B), the wireless field 708A may induce a voltage within these conductive objects. This induced voltage may cause a current to flow in the conductive objects.

Accordingly, since the generated current flows caused by the induced voltages are in the same direction and the solenoid coils 512A and 512B are coupled in the series opposing configuration, the generated currents (and induced voltages) may cancel. However, the DD coils 506A and 506B may both generate a current flow based on induced voltages caused by the wireless fields 708A and 708C. As opposed to the flow of the flux 708A as described above in relation to FIGS. 7A-7C, in the system 700 of FIG. 7D, the flux 708A flows through the DD coils 506A and 506B. Additionally, the flux 708C flows through the DD coils 506A and 506B. Accordingly, the DD coils 506A and 506B are in a peak coupling position when the DD-solenoid coil 500 is offset from the base pad 710 in a horizontal direction in a direction of travel. As flux of the magnetic field (e.g., flux 708D) does not flow through any components of the DD-solenoid coil 500, no current or voltage is induced by the magnetic field 708D.

At this position, the DD coils 506A and 506B may couple with the wireless field generated by the coil 702. Accordingly, the wireless fields 708A and 708C may not induce measureable voltages within the solenoid coils 512A and 512B while inducing measurable voltages within the DD coils 506A and 506B. Thus, the solenoid coils 512A and 512B may experience a lower level of coupling when the DD-solenoid coil 500 is positioned above the base pad 710 at a defined offset.

Accordingly, the DD coils 506A and 506B of the DD-solenoid coil 500 enable the DD-solenoid coil 500 to engage in the wireless power transfer when the solenoid coils 512A and 512B are not as strongly coupled to the wireless field 708. Thus, the DD coils 506A and 506B increase the usable range of the DD-solenoid coil 500.

Figure 7E:
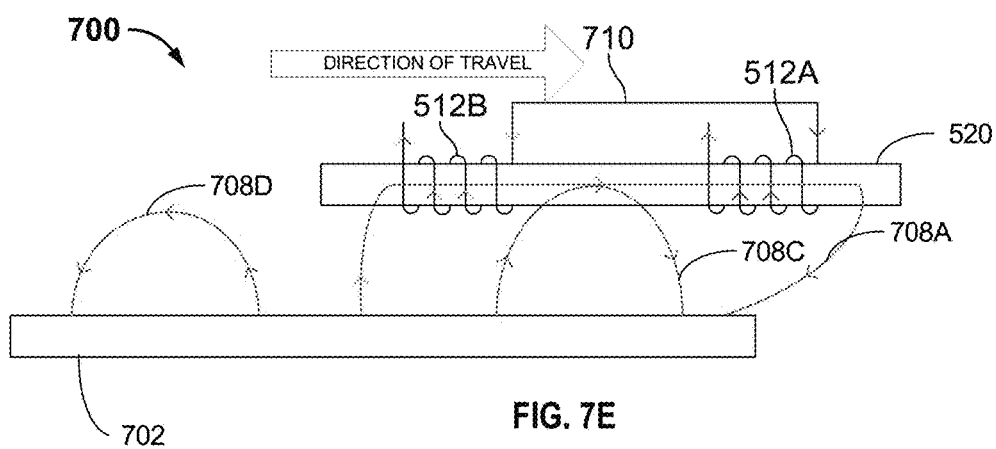
FIG. 7E shows a side view current and flux flow diagram of the system of FIG. 7A comprising the DD-solenoid coil and base pad of FIGS. 7A-7D.

FIG. 7E shows a side view current and flux flow diagram of the system of FIG. 7A comprising the DD-solenoid coil 500 and base pad 710 of FIG. 7D. As discussed above, the flux 708A flows through the solenoid coils 512A and 512B, respectively, in the same direction. Accordingly, the currents generated in the solenoid coils 512A and 512B based on the voltages induced by the wireless field 708A are in the same direction. The current flow in solenoid coil 512A generated based on the flux 708A flows from the right end to the left end of the solenoid coil 512A. The current flow in the solenoid coil 512B, also generated based on the wireless field 708A, also flows from the right end to the left end of the solenoid coil 512B. Accordingly, since the segment 610 couples the solenoid coils 512A and 512 in the series opposing configuration, the generated currents (and induced voltages) cancel, as shown by the current flow direction arrows shown in FIG. 7E. Alternatively, if the solenoid coils 512A and 512B were coupled in the SA configuration (FIG. 6A), the opposite directions of the currents would cause the generated currents (and induced voltages) to sum.

Figure 8A:
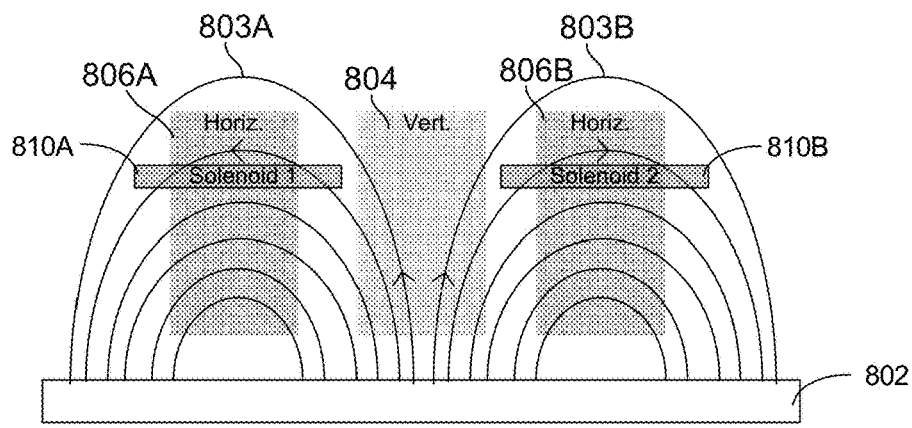
FIG. 8A shows a vertically polarized circular base pad generating flux in vertical and horizontal regions to two solenoid coils positioned within the horizontal regions.

FIG. 8A shows a vertically polarized circular base pad 802 generating flux 803A and 803B in a vertical region 804 and two horizontal regions 806A and 806B to two solenoid coils 810A and 810B positioned within the horizontal regions 806A and 806B. The base pad 802 generates flux 803A and 803B in two opposite directions (flux 803A in the counterclockwise direction and flux 803B in the clockwise direction). The flux 803A and 803B are substantially vertical in the middle of the base pad 802 (e.g., vertical region 804). The flux 803A and 803B are substantially horizontal near the edges of the base pad 802 (e.g., horizontal regions 806A and 806B, respectively). The solenoids coils 810A and 810B (corresponding to solenoid coils 512A and 512B of FIGS. 5A-5C) are positioned in the horizontal regions 806A and 806B, respectively.

The base pad 802 will achieve peak coupling with a vertically polarized receiver pad (not shown) when the two vertically polarized pads are properly aligned (e.g., the center of the vertically polarized receiver pad is aligned within the vertical region 804). However, the flux 803A and 803B within the horizontal regions 806A and 806B may be wasted. Accordingly, the solenoid coils 810A and 810B positioned in either of the horizontal regions 806A and 806B may couple to the base pad 802 since the flux 803A and 803B is horizontal. As discussed above, the flux 803A is in the opposite direction of the flux 803B. Accordingly, voltages induced by each of the two solenoid coils 810A and 810B add up (e.g., sum) when the two solenoid coils 810A and 810B are connected in a series opposing configuration. As both the DD coils (not shown in this figure) and the solenoid coils 810A and 810B are coupled to a receive circuitry, the wireless power received from both of these sets of coils may be used by a device to which the DD-solenoid coil is coupled (e.g., for use in providing power to the device or charging the device).

The flux directions of the vertical and horizontal regions 804 and 806A-806B are somewhere between the horizontal and vertical directions in each of the regions. A presence of ferrite (not shown) in the receiver pad (not shown) will attract flux and favor either the vertical or horizontal direction depending on a horizontal offset from the base pad 802.

Accordingly, optimization may ensure that the power output DD and Split series opposing solenoids is complementary. In some implementations, optimization means adjusting physical parameters of the coil(s) (length, width, spread, turns etc.) on the transmitter and/or receiver pads to meet system requirements such as horizontal/vertical tolerance, magnetic field emissions limits, etc. Optimization may also lower cost, weight, size, material use and so on. For example, a transmitter coil of FIG. 10 described herein is optimized to a reduced size (as compared to a transmitter coil of FIG. 9) that better matched receiver coil positions, resulting in increased coupling.

Figure 8B:
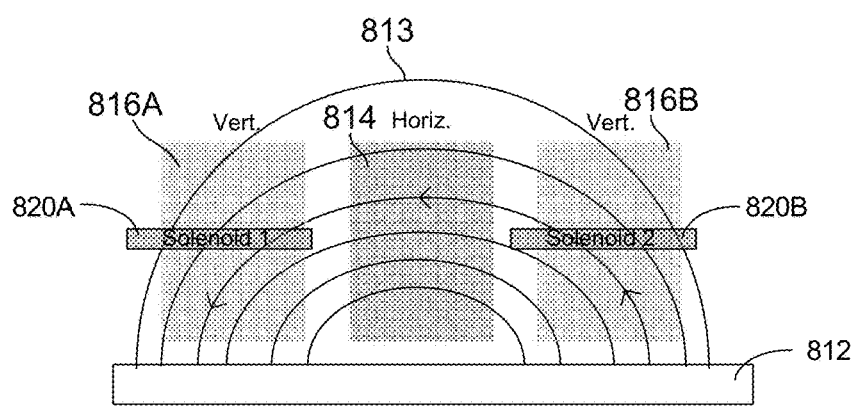
FIG. 8B shows a horizontally polarized DD base pad generating flux in vertical and horizontal regions to two solenoid coils positioned within the vertical regions.

FIG. 8B shows a horizontally polarized DD base pad 812 generating flux 813 in two vertical regions 816A and 816B and a horizontal region 814 to two solenoid coils 820A and 820B positioned within the vertical regions 816A and 816B. The base pad 812 generates flux 803 in a counterclockwise direction. The flux 813 is substantially vertical at the edges of the base pad 812 (e.g., vertical regions 816A and 816B, respectively). The flux 813 is substantially horizontal near the middle of the base pad 812 (e.g., horizontal region 814). The solenoids coils 820A and 820B (corresponding to solenoid coils 512A and 512B of FIGS. 5A-5C) are positioned in the vertical regions 816A and 816B, respectively.

As shown, the base pad 812 generates the flux 813 predominantly in the horizontal direction. A DD receiver pad (not shown) may achieve peak coupling with the base pad 812 when vertically aligned with the base pad 812 (e.g., the center of the DD receiver pad is aligned within the horizontal region 814). The DD base pad 812 and the DD receiver pad comprise 'D'-shaped coils that are in a series adding configuration (all DDs coils are configured in this manner). Accordingly, voltages induced in the DD base pad 812 and receiver pad sum. For example, if the base pad 812 is excited with a time varying current, a voltage may be induced in the DD receiver pad, and because the base pad 812 and DD receiver pad are in the series aiding configuration, the voltages sum. The flux 813 may be predominantly horizontal in a single direction throughout the receiver pad ferrite (not shown). Accordingly, a voltage induced in the solenoid coil 820A will be cancelled by the voltage induced in the solenoid coil 820B when the two solenoid coils 820A and 820B are connected in the series opposing configuration, resulting in no net coupling (no power output).

Figure 8C:
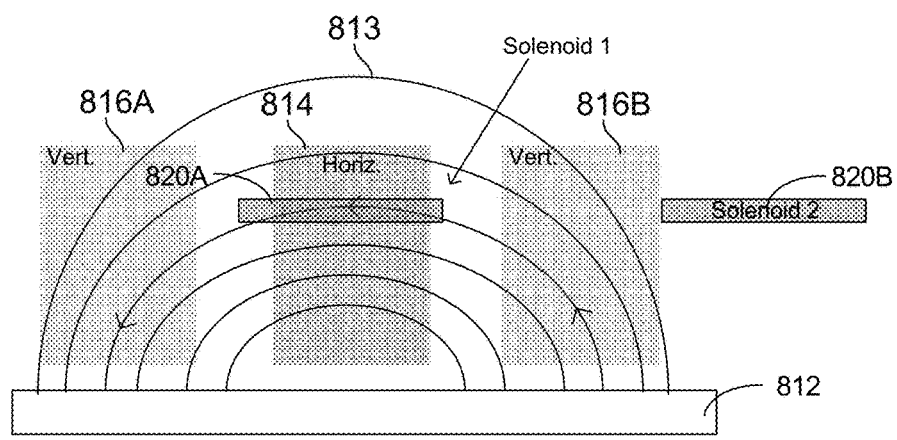
FIG. 8C shows the horizontally polarized DD base pad of FIG. 8B generating flux in the vertical and horizontal regions, where one of the solenoid coils is positioned within the horizontal region.

FIG. 8C shows the horizontally polarized DD base pad 812 of FIG. 8B generating flux 813 in the vertical regions 816A and 816B and the horizontal region 814, where the solenoid coil 820A is positioned within the horizontal region 814. With the solenoid coil 820A in the horizontal region 814 and the solenoid coil 820B off the edge of the base pad 812, the receiver pad containing the solenoid coils 820A and 820B is determined to be offset horizontally from the base pad 812. Accordingly, the solenoid coil 820A approaches the center of the base pad 812. Accordingly, the solenoid coil 820A achieves peak coupling because the flux 813 is strongly horizontal. The solenoid coil 820B may not couple much power due to its distance from the flux 813. Accordingly, the solenoid coils 820A and 820B should be spaced such that the solenoid coil 820B does not couple any of the flux 813 while the solenoid coil 820A is coupled to the flux 813. This is because the solenoid coils 820A and 820B are connected in the series opposing configuration and the voltage induced by each of the solenoid coils 820A and 820B will oppose each other if the flux 813 passing through each solenoid coils 820A and 820B is in the same direction. This opposition may actually cause a reduction in the output power due to cancellation.

Given that only one of the two solenoid coils 820A and 820B are coupling to the flux 813, an output power of the combined solenoid coils 820A and 820B may be lower than that of a matching horizontal DD receiver (not shown). Accordingly, the solenoid coils 820A and 820B may supplement the DD receiver and to improve a horizontal operating range of the combined DD-solenoid receiver pad.

Figure 9:
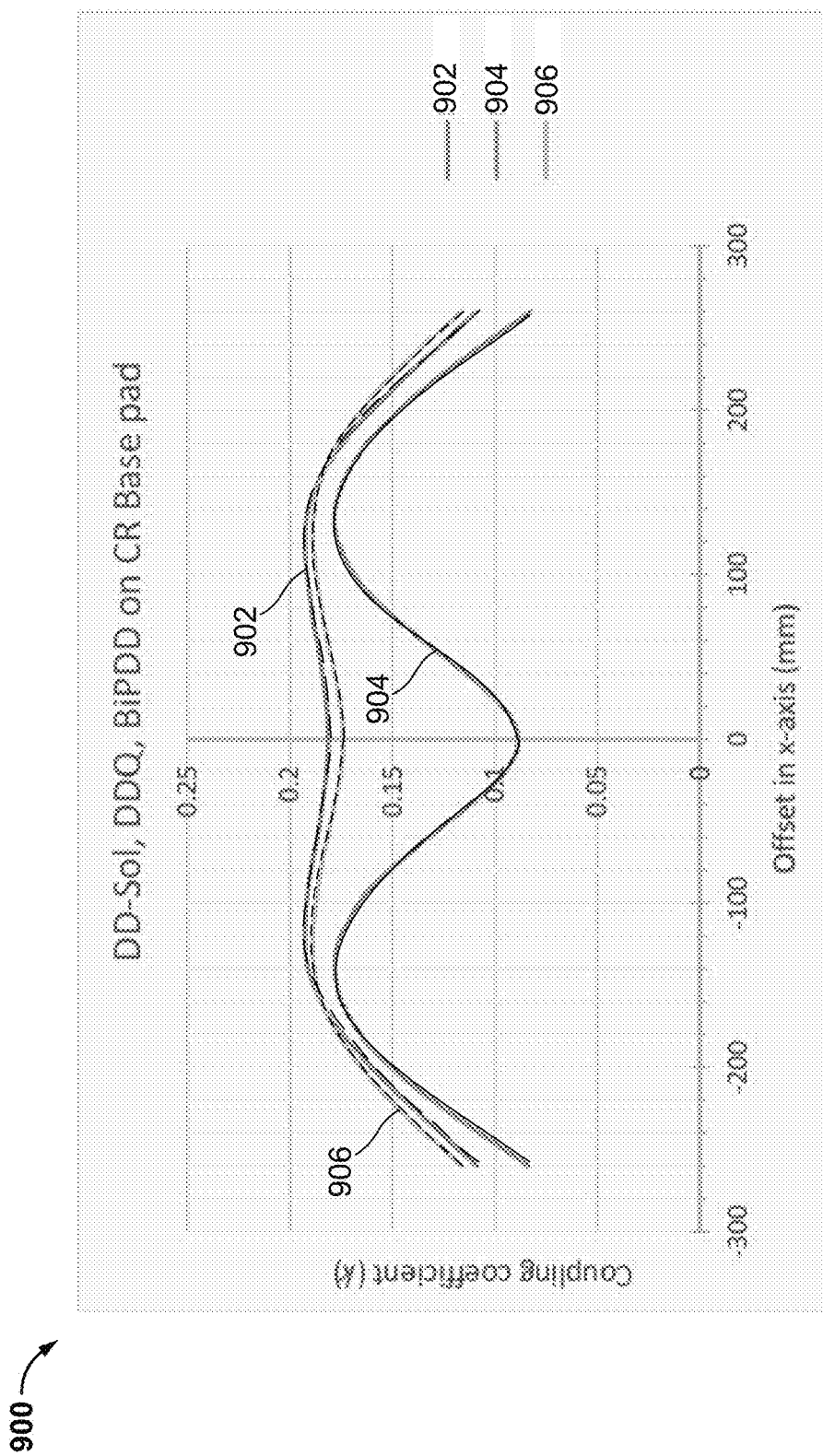
FIG. 9 shows a graph representing a coupling coefficient of various DD-type coils as a function of a horizontal offset distance of coils from a base pad.

FIG. 9 shows a graph representing a coupling coefficient of various DD-type coils as a function of a horizontal offset distance of coils from a base pad (e.g., the base pad 710 of FIGS. 7A-7E). The graph 900 shows the horizontal offset distance (e.g., in the direction of travel of FIGS. 7A-7E) of the various DD-type coils in relation to the base pad in along an x-axis (in millimeters) of the graph 900. The y-axis of the graph 900 represents a coupling coefficient (k) (e.g., strength of coupling) between each of the DD-type coils and the base pad.

The graph 900 shows three (3) curves (lines 902-906) corresponding to different DD-type coils. The three different DD-type coils are: the double-D quadrature (DDQ) coil (line 902), the bi-polar double-D (BiPDD) coil (line 904), and the DD-solenoid coil 500 (line 906). The bi-polar double-D (BiPDD) coil may comprise a first DD coil and a second DD coil, where at least a portion of the first DD coil overlaps at least a portion of the second DD coil. A DDQ coil may refer to placing a DD coil and a quadrature coil (e.g., a circular coil topology as one example that is positioned to have substantially reduced or zero mutual coupling with the DD coil).

For example, each line 902-906 indicates a different combination of coils including DD coils and at least one other coil (e.g., quadrature, Bi-Polar, or solenoid). The lines 902, 904, and 906 indicate that the coupling coefficient between the DD-type coils and the base pad varies as the DD-type coils travel along the x-axis (in the direction of travel).

The graph 900 shows that the DDQ and the DD-solenoid coils have very similar coupling coefficient properties, both of which provide improved coupling coefficients when compared to the BiPDD coil. When nearing the larger offsets, the DD-solenoid coil 500 is shown to actually have a slightly improved coupling coefficient over the DDQ coil (shown as the line 906 being greater than the line 902 at <−200 mm and >200 mm). The coupling coefficient (of the y-axis) may correspond to the wireless power transfer capabilities wireless power coils. The higher the coupling coefficient, the greater the coupling between the DD-type coils and the base pad and the greater the quantity of power transferred therebetween.

Figure 10:
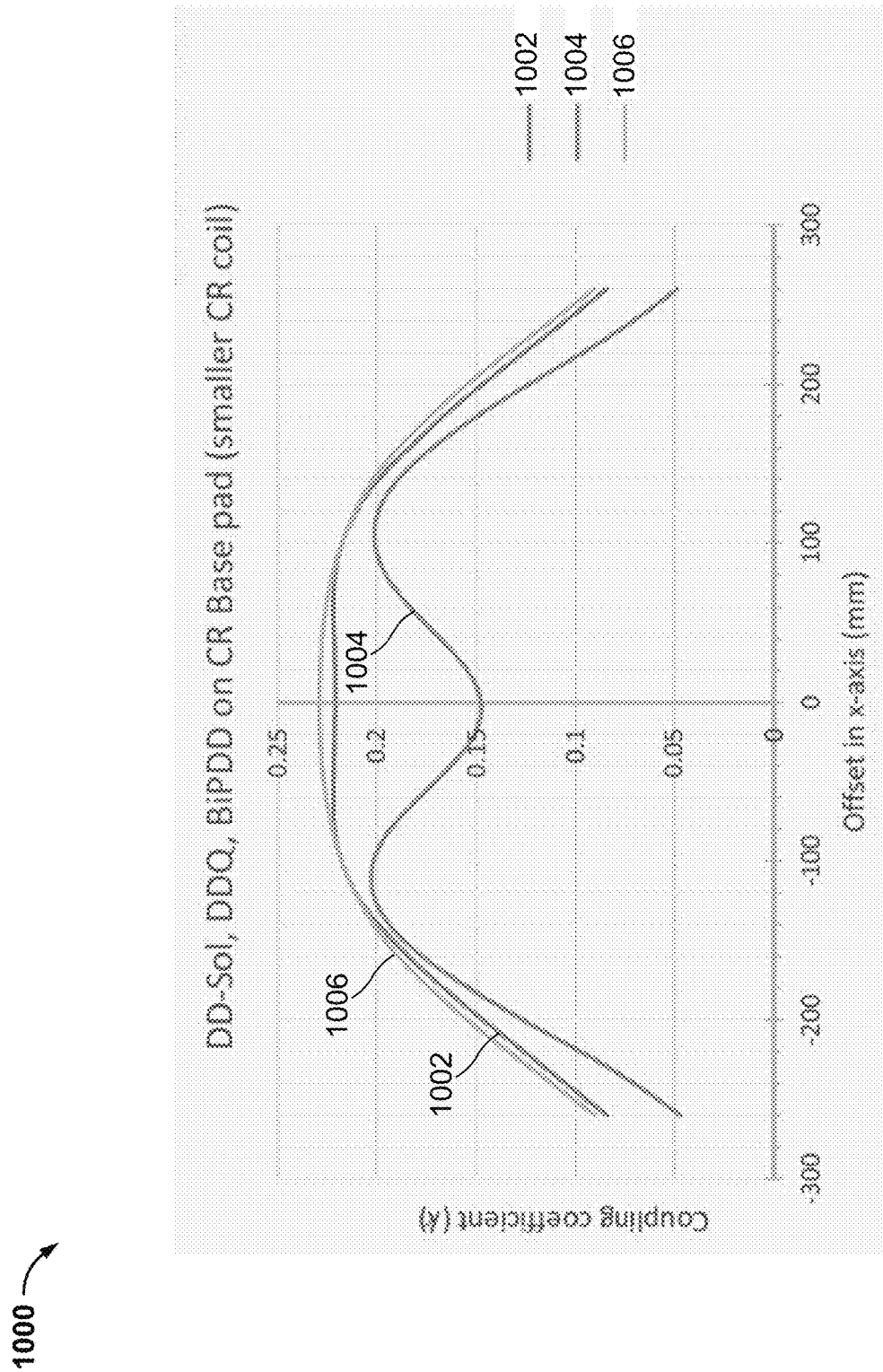
FIG. 10 shows a graph representing a coupling coefficient of various DD-type coils as a function of a horizontal offset distance of coils from another base pad, the other base pad having similar dimensions as but a smaller coil than the base pad of FIG. 9.

FIG. 10 shows a graph representing a coupling coefficient of various DD-type coils as a function of a horizontal offset distance of coils from another base pad (e.g., the base pad 710 of FIG. 7A-7E but covering a smaller area than the base pad of FIG. 9). The graph 1000 shows the horizontal offset distance (e.g., in the direction of travel of FIGS. 7A-7E) of the various DD-type coils in relation to the base pad along an x-axis (in millimeters) of the graph 1000. The y-axis of the graph 1000 represents a coupling coefficient (k) (e.g., strength of coupling) between each of the DD-type coils and the base pad.

The graph 1000 shows three (3) curves (lines 1002-1006) corresponding to different DD-type coils. The three different DD-type coils are: the DDQ coil (line 1002), the BiPDD coil (line 1004), and the DD-solenoid coil 500 (line 1006). For example, each line 1002-1006 indicates a different combination of coils including DD coils and at least one other coil (e.g., quadrature, Bi-Polar, or solenoid). The lines 1002, 1004, and 1006 indicate that the coupling coefficient between the coils and the smaller base pad varies as the DD-type coils travel along the x-axis (in the direction of travel).

The graph 1000, similar to graph 900, shows that the DDQ and the DD-solenoid coils have similar coupling coefficient properties, both of which provide improved coupling coefficients when compared to the BiPDD coil. Along almost all offsets, the DD-solenoid coil 500 is shown to actually have a slightly improved coupling coefficient over the DDQ coil (shown as the line 1006 being greater than the line 1002). The y-axis represents a strength of the coupling between the DD-type coils and the base pad, which may correspond to the wireless power transfer capabilities of the DD-type coils. The higher the coupling coefficient, the greater the coupling between the DD-type coils and the base pad and the greater the quantity of power transferred therebetween.

Figure 11:
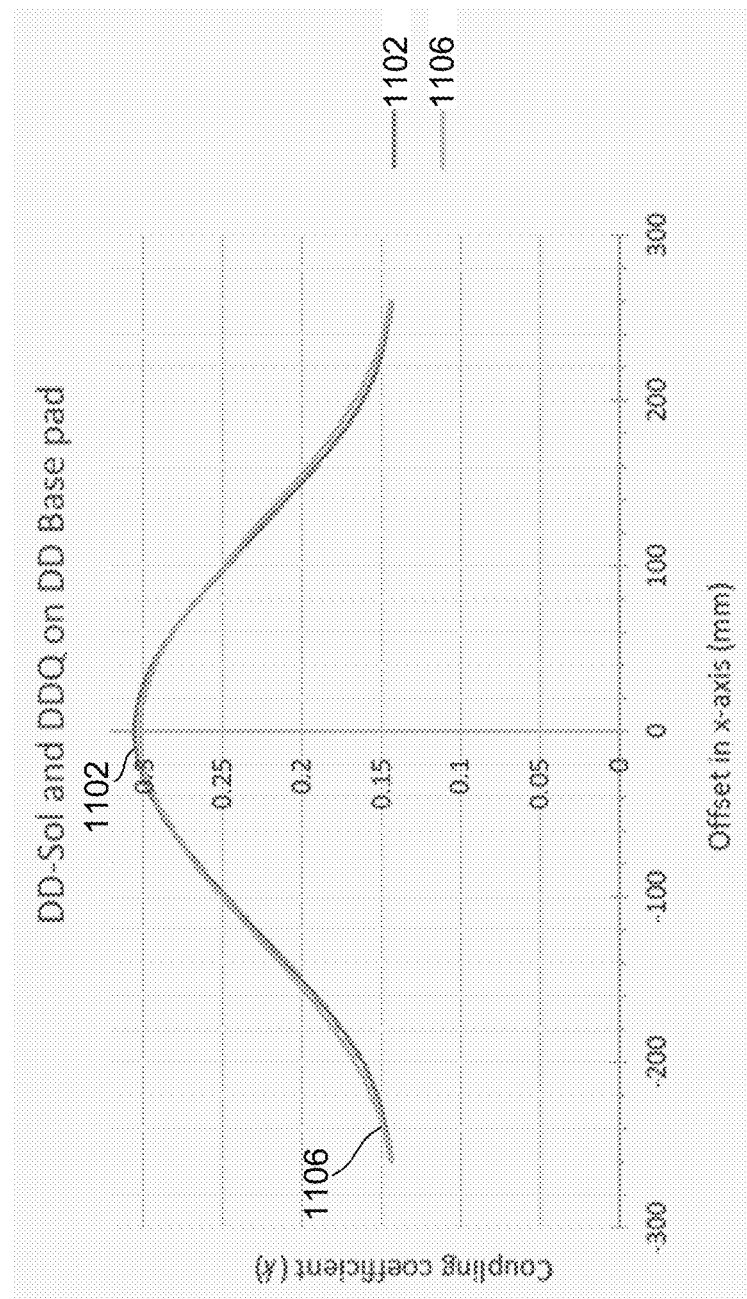
FIG. 11 shows a graph representing a coupling coefficient of various DD-type coils as a function of a horizontal offset distance from a DD base pad.

FIG. 11 shows a graph representing a coupling coefficient of a DD-solenoid coil and a DDQ coil as a function of a horizontal offset distance of the DD-solenoid coil and the DDQ coil from a DD base pad. The graph 1100 shows the horizontal offset distance (e.g., in the direction of travel of FIGS. 7A-7E) of the DD-solenoid coil and the DDQ coil in relation to the DD base pad along an x-axis (in millimeters) of the graph 1100. The y-axis of the graph 1100 represents a coupling coefficient (k) (e.g., strength of coupling) between the DD-solenoid coil and the DDQ coil and the DD base pad.

The graph 1100 shows two (2) curves (lines 1102 and 1106) corresponding to the DD-solenoid coil 1106 and the DDQ coil 1102. Each line 1102 and 1106 indicates a different combination of coils including DD coils and at least one of quadrature or solenoid coils. Accordingly, the lines 1102 and 1106 indicate that the coupling coefficient between the DD-solenoid coil and the DDQ coil and the DD base pad at various positions as the coils travel along the x-axis (in the direction of travel). As shown by graph 1100, the DDQ and DD-solenoid coils provide similar performance throughout the horizontal offset distance in the direction of travel in relation to the DD base pad.

The DD-solenoid coil 500 may prove equally or more efficient with regard to wireless power transfer when compared to other coil topologies. In addition, the DD-solenoid coil 500 may be cost effective to manufacture and provide different variations that may reduce ill-effects associated with wireless power transfer. For example, the DD-solenoid coil 500 may require less copperas compared to certain other topologies. Additionally, or alternatively, the DD-solenoid coil 500 may comprise less ferrite than other certain other topologies. In some implementations, the solenoid coils 512A and 512B may be adapted to reduce loss or emissions in objects in close proximity to the solenoid coils 512A and 512B.

Figure 12A:
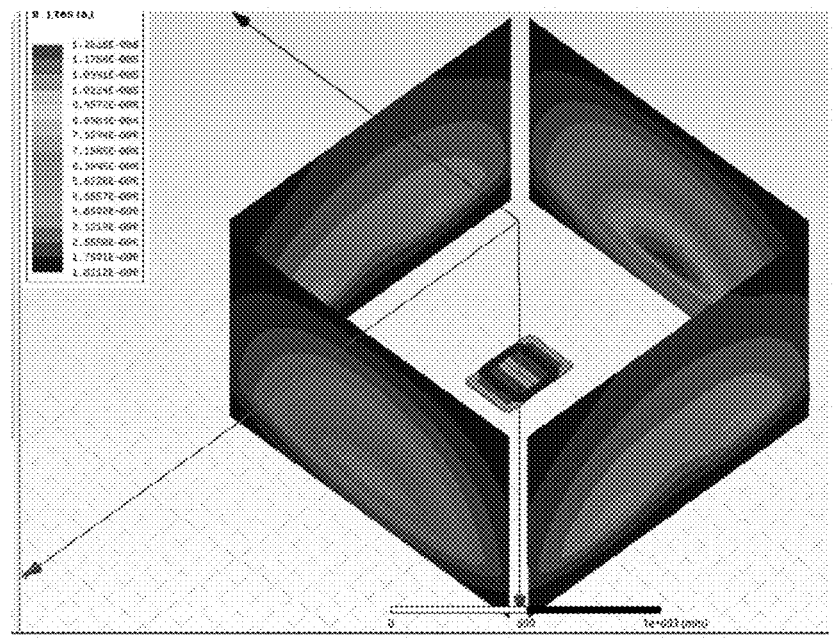
FIG. 12A shows a 3D emissions diagram showing field emissions from a DDQ coil.

FIG. 12A shows a 3D emissions diagram showing field emissions from the DDQ coil. The DDQ coil may create a wireless field that emanates from the location of the DDQ coil. The FIG. 12A shows the strength the wireless field that emanates from the DDQ coil at given distances around the DDQ coil.

Figure 12B:
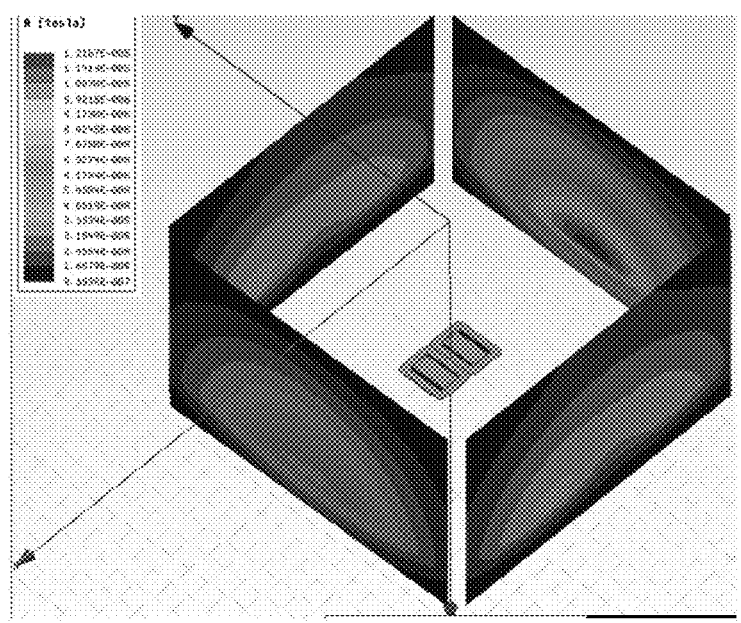
FIG. 12B shows a 3D emissions diagram showing field emissions from a DD-solenoid coil.

FIG. 12B shows a 3D emissions diagram showing field emissions from the DD-solenoid coil 500. The DD-solenoid coil 500 may also create a wireless field that emanates from the location of the DD-solenoid coil 500, similar to the DDQ coil described above in FIG. 12A. However, unlike the DDQ coil described in FIG. 12A, the DD-solenoid coil may have a reduced emission as compared to the DDQ coil at the same given distances shown in FIG. 12A. The reduction in field emission may be caused by the use of opposing solenoids which cancel fields generated by each other. As a result of this cancellation, the leakage fields of the DD-solenoid coil 500 may be reduced as compared to traditional solenoids.

Figure 13A:
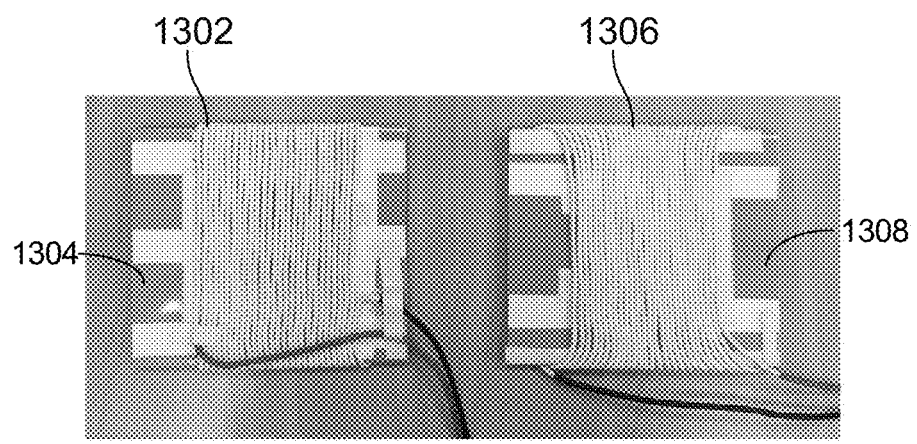
FIGS. 13A and 13B show overhead views of the tops and bottoms of solenoid coils each comprising a conductor wound about a core.
Figure 13B:
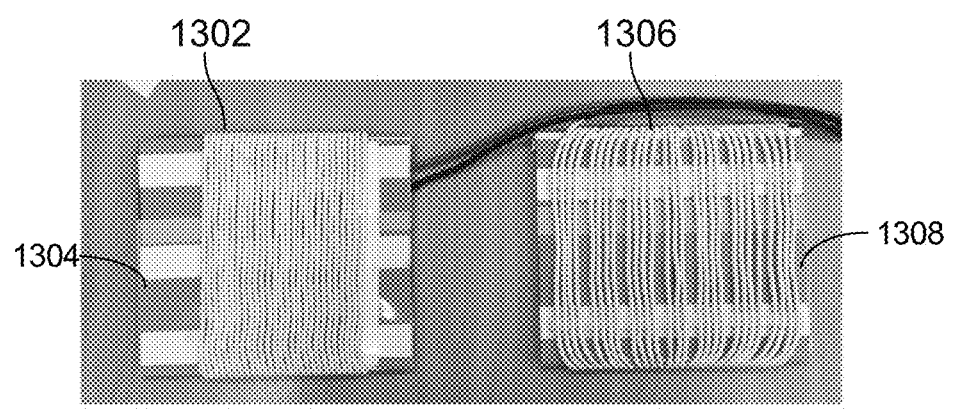

FIGS. 13A and 13B show overhead views of the upper and lower surfaces of solenoid coils 1302 and 1306 each comprising a conductor wound about a core 1304 and 1308, respectively. FIG. 13A shows an overhead view of the upper surface of solenoid coils 1302 and 1306 (corresponding to the solenoid coil 512 of FIG. 5A). The upper surface of the solenoid coils 1302 and 1306 is the surface that faces a base pad. The lower surface of each of the solenoid coils 1302 and 1305 is the surface that faces away from the base pad (e.g., vehicle facing surface). Each of the solenoid coils 1302 and 1306 have windings that are wound about the core 1304 and 1308 (corresponding to core 520 of FIG. 5A), respectively. The overhead view shows the layout of the conductor that forms each of the windings for two different layouts. The first layout on the left shows the conductor forming the windings of the solenoid coil 1302. The windings formed by the conductor are substantially parallel as they wrap around the core, with minimal space between adjacent windings (e.g., adjacent windings are in contact with each other). The second layout on the right shows the conductor forming the windings of the solenoid coil 1306 in a "spread" way. In the spread way, the windings on the upper surface of the solenoid coil 1306 may be substantially parallel, but the windings on the lower surface of the solenoid coil 1306 are spread apart (e.g., positioned such that adjacent windings are not in contact with each other). As shown in FIG. 13A, the windings of the two layouts are geometrically different at the edges where they wrap around the core 1304 and 1308. The windings of the solenoid coil 1302 are substantially parallel as they wrap around the edges of the core 1304. The windings of the solenoid coil 1306 are tapered outward as they wrap around the edges of the core 1308.

FIG. 13B shows an overhead view of the lower surface of solenoid coils 1302 and 1306. The overhead view shows the layout of the conductor that forms each of the windings for two different layouts. The first layout (solenoid coil 1302) shows the conductor forming the windings of the solenoid coil 1302, where the windings on the upper side of the solenoid coil 1302 are spaced the same as the windings on the lower side of the solenoid coil 1302. The second layout shows the conductor forming the windings of the solenoid coil 1306 in a "spread" way, where the windings on the lower side of the solenoid coil 1306 are spread farther apart than the windings on the upper side of the solenoid coil 1306.

Solenoid coils produce a symmetrical wireless field when the conductor is placed as shown in FIG. 13A, where energy may be wasted in a wireless field produced by the solenoid coil. The wireless field is directed toward the back plate and may create a significant eddy current loss. Accordingly, the conductor may be placed in the "spread" way. Spreading the coil (e.g., placing the conductor such that a space exists between adjacent rows) may reduce coupling among or within the windings caused by higher reluctance paths than when the windings of the solenoid coil are closely spaced. Accordingly, the spread manner may result in lower wireless field density and lower eddy current loss than when the windings are closely spaced.

In addition to separating the windings on the lower side of the solenoid coil 1306, the windings on the lower surface may be spaced further away from the core 1308 than the windings on the upper surface. Moving the lower surface of windings away from the core 1308 may further reduce the wireless field generated by the lower surface of windings. Thus, the loss may be further reduced.

Figure 14:
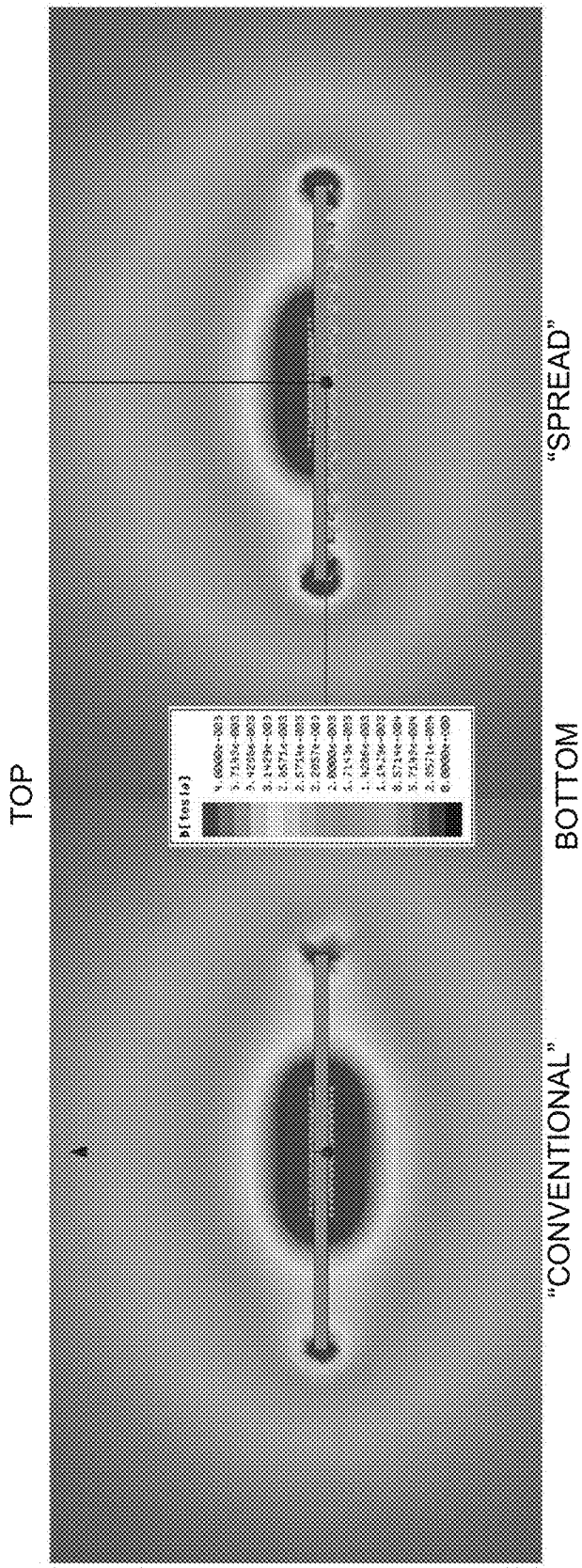
FIG. 14 shows a power emission diagram showing the field emitted by the solenoid having windings distributed with no space between adjacent windings versus the solenoid having windings distributed with space between adjacent windings.

FIG. 14 shows an emission diagram showing the field emitted by the solenoid having windings distributed with no space between adjacent windings versus the solenoid having windings distributed with space between adjacent windings. As shown, the solenoid having the windings distributed with no or minimal space between adjacent coils on the lower surface creates a wireless field on both the upper and lower surfaces of the solenoid. However, the solenoid having the windings distributed in the spread way (space between adjacent coils) on the lower surface creates a similar wireless field only on the upper surface but creates a collection of smaller wireless fields on the lower surface of the solenoid as compared to the solenoid distributed with no space between adjacent coils. Accordingly, where the upper surfaces of the solenoids are used for coupling, the in contact or spread ways of distributing the windings have no impact and the fields created by the windings on the upper surfaces are unchanged. However, by distributing the windings on the lower surface in the spread way, the fields created by the windings on the lower surface may be reduced, and, thus, corresponding losses in the backplate may be reduced as compared to the distribution with minimal space between adjacent coils. In some implementations, the spread distribution of windings may reduce loss in the backplate by 15% as compared to other distributions. In some implementations, the loss differential may be greater or less than 15%, depending on the spacing between adjacent windings.

Figure 15:
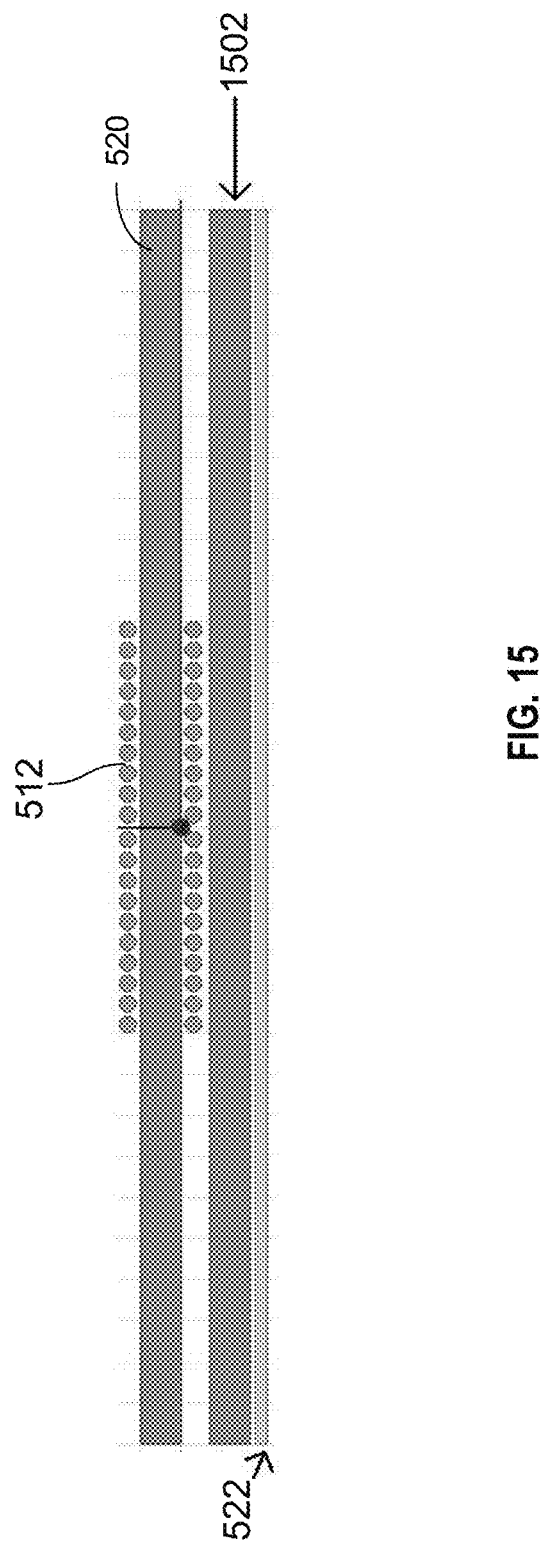
FIG. 15 shows the solenoid coil wound about the core as mounted to a vehicle pad back plate having an added layer of ferrite between the solenoid coil and the vehicle pad back plate.

FIG. 15 shows the solenoid coil 512 wound about the core 520 as mounted to the backplate 522 having an added layer of ferrite 1502 between the solenoid coil 512 and the backplate 522. The solenoid coil 512 wound about the core 520 is mounted directly to the backplate 522 and installed on the bottom of the vehicle (e.g., vehicle 401 of FIG. 4). The flux generated by the solenoid coil 512 may induce eddy currents in the backplate 522. These eddy currents may create losses in the backplate 522. Accordingly, adding the ferrite layer 1502 between the solenoid coil 512 and the backplate 522 may serve to reduce losses in the backplate 522. The ferrite layer 1502 may confine the flux generated by the solenoid coil 512 to a smaller area (i.e., the area between the solenoid coil 512 and the ferrite layer 1502. Accordingly, the emissions of the solenoid coil 512 may be reduced. For example, without the ferrite layer 1502, the solenoid coil 512 of FIG. 15 may have field emissions of 13.8 uT, while the ferrite layer 1502 may reduce the field emissions of the solenoid coil 512 to 8.8 uT. In some implementations, the ferrite layer 1502 may be less thick than the core 520, for example less than half a thickness of the core 520. In some implementations, the ferrite layer 1502 may be thicker than the core 520.

In some implementations, the ferrite layer 1502 may be combined with the spread distribution of windings as discussed in relation to FIG. 14 to further reduce the loss generated by the solenoid coil 512. In some implementations, the ferrite layer 1502 and the spread distribution of windings may be integrated into the DD-solenoid coil 500 so as to reduce emissions and loss generated by the DD-solenoid coil 500. In some implementations, the DD-solenoid coil 500 may be used either to receive wireless power from a transmitter to power or charge a load (e.g., the vehicle 401 of FIG. 4). In some implementations, the DD-solenoid coil 500 may be used to generate a wireless field to transmit power to a receiver to power or charge a load.

Figure 16A:
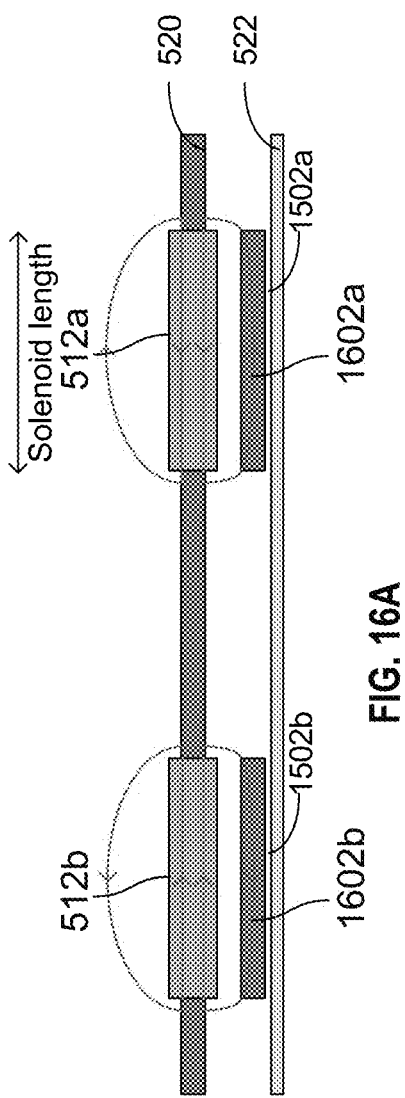
FIG. 16A shows an alternate implementation of the added layer of ferrite of FIG. 15 between the solenoid coil and the vehicle pad back plate in a series opposing configuration.

FIG. 16A shows an alternate implementation of the added layer of ferrite of FIG. 15 between the solenoid coil and the vehicle pad back plate in a series opposing configuration. In FIG. 16A, the ferrite layer 1502 is shown as two individual ferrite pieces 1502*a* and 1502*b*. The ferrite pieces 1502*a* and 1502*b* are shown below solenoid coils 512*a* and 512*b*, respectively. Individual ferrite pieces 1502*a* and 1502*b* may be implemented in a series opposing configuration (as shown) where there is no common flux through the solenoid coils 512*a* and 512*b* and, thus, no flux flows between the ferrite pieces 1502*a* and 1502*b*. Instead flux lines 1602*a* and 1602*b* are shown flowing through the ferrite pieces 1502*a* and 1502*b*, respectively.

Figure 16B:
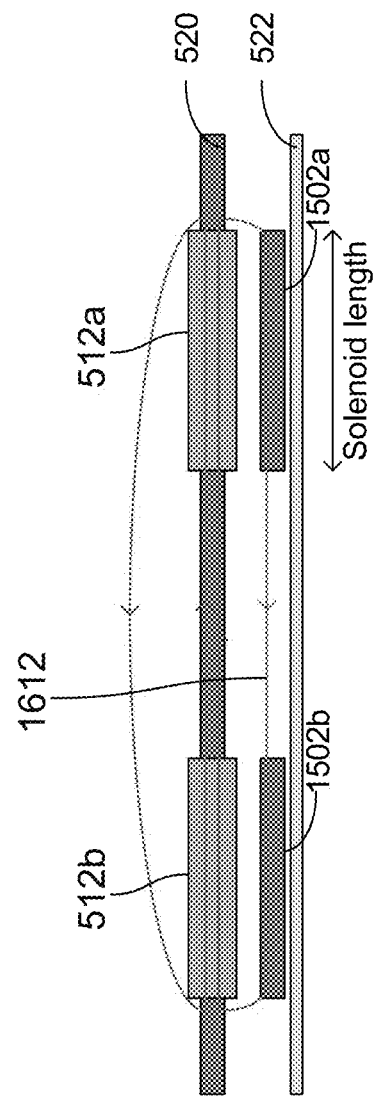
FIG. 16B shows another alternate implementation of the added layer of ferrite of FIG. 15 between the solenoid coil and the vehicle pad back plate in a series aiding configuration.

FIG. 16B shows another alternate implementation of the added layer of ferrite of FIG. 15 between the solenoid coil and the vehicle pad back plate in a series aiding configuration. In the series aiding configuration, a flux line 1612 may be expected to travel between the ferrite pieces 1502*a* and 1502*b*. However, given the space between the ferrite pieces 1502*a* and 1502*b*, there may be a loss in a total flux as compared to the flux of a full ferrite layer 1502. However, as the flux line 1612 flowing through the ferrite pieces 1502*a* and 1502*b* is parallel rather than incident to the backplate 522, the loss is expected to be small. The ferrite pieces 1502*a* and 1502*b* provide a lower cost and lower weight shielding method as compared to the ferrite layer 1502 of FIG. 15.

Figure 17:
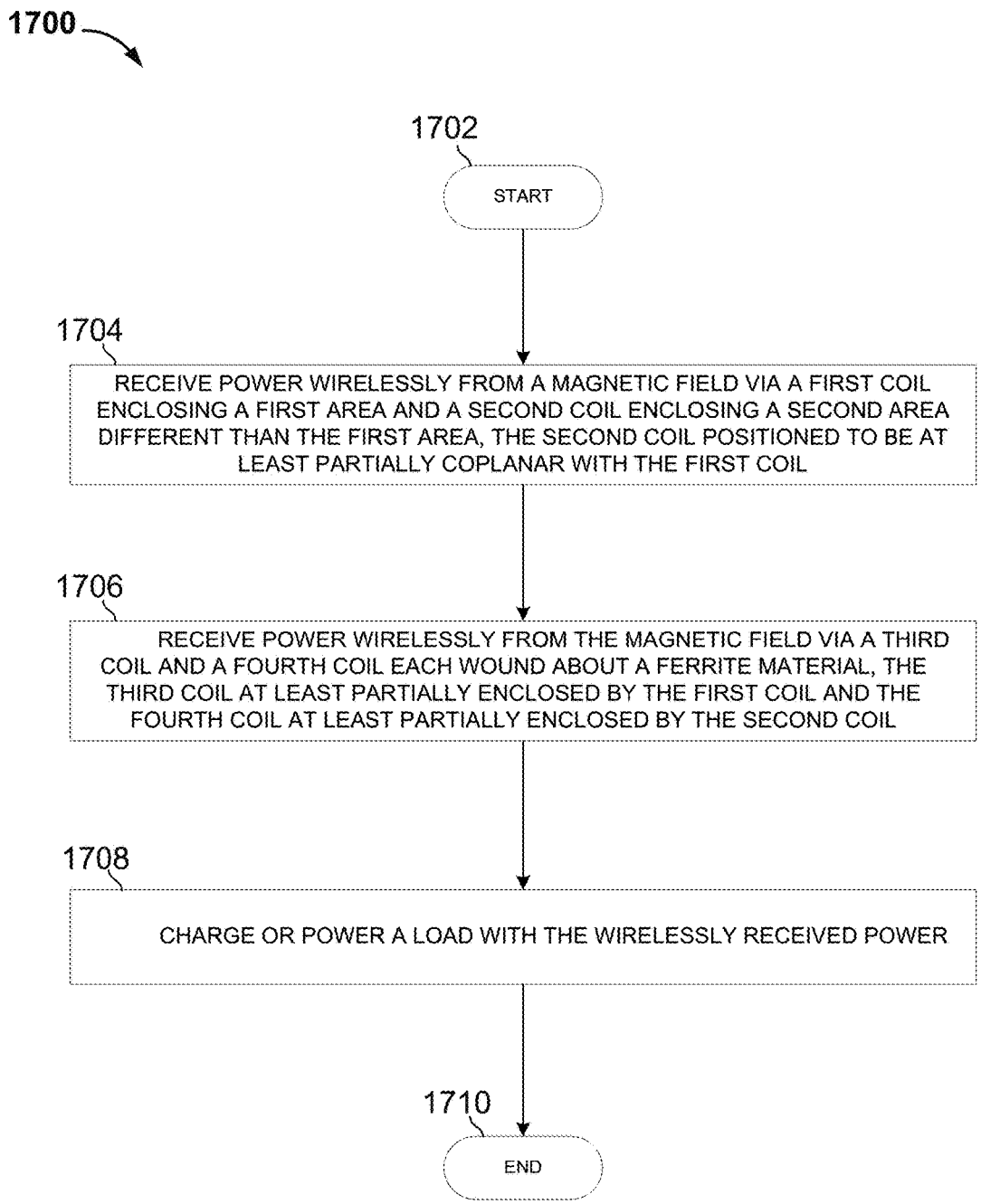
FIG. 17 shows a flowchart of a method of transferring power via a DD-solenoid coil.

FIG. 17 shows a flowchart of a method 1700 of transferring power via a DD-solenoid coil. The method 1700 begins at block 1702 and proceeds to block 1704. At block 1704, the DD-solenoid coil receives power wirelessly from a magnetic field via a first coil enclosing a first area and a second coil enclosing a second area different than the first area, the second coil positioned to be at least partially coplanar with the first coil. As described herein, the first and second conductive loops may correspond to the DD coils 506A and 506B as described in reference to FIG. 5. The first component of the magnetic field may correspond to a horizontal or vertical component of the magnetic field (e.g., within the vertical region 804 and horizontal regions 806A and 806B of FIG. 8A), wherein the horizontal or vertical components are defined by a direction of a flow of flux within the corresponding region. Accordingly, the first component of the magnetic field may correspond to a direction of flux that is predominantly present within the vicinity of the first and second conductive loops. Once the method 1700 receives the first wireless power at block 1704, the method 1700 proceeds to block 1706.

At block 1706, the DD-solenoid coil receives power wirelessly from the magnetic field via a third coil and a fourth coil each wound about a ferrite material, the third coil at least partially enclosed by the first coil and the fourth coil at least partially enclosed by the second coil. In some implementations, the first and second sets of windings correspond to the solenoid coils 512A and 512B. Furthermore, the second component of the magnetic field may correspond to the other of the horizontal and vertical components. In some implementations, the flux received by the first and second sets of windings may be added when the first and second sets of windings are coupled in a series aiding configuration. Once the second wireless power is received, the method 1700 proceeds to block 1708.

At block 1708, the wirelessly received power is used to power or charge a load (e.g., a battery or electronic device). Once the load is charged or powered, the method 1700 proceeds to block 1710, where it ends.

In some embodiments, an apparatus for wireless power transfer may perform one or more of the functions of method 1700, in accordance with certain embodiments described herein. The apparatus may comprise first means for transferring or receiving power wirelessly from a magnetic field, the first transferring or receiving means enclosing a first area, and second means for transferring or receiving power wirelessly from the magnetic field, the second transferring or receiving means enclosing a second area different than the first area and the second transferring or receiving means positioned to be at least partially coplanar with the first transferring or receiving means. In certain embodiments, the first and second transferring or receiving means can be implemented by the DD coils 506A and 506B (FIG. 5A). In certain embodiments, the first and second transferring or receiving means can be configured to perform the functions of block 1704 (FIG. 17). The apparatus may further comprise means for varying distribution of the magnetic field. In certain embodiments, the distribution varying means can be implemented by the ferrite material 520 (FIG. 5A). In certain embodiments, the distribution varying means can be configured to perform at least a portion of the functions of block 1706 (FIG. 17). The apparatus may comprise third means for transferring or receiving power wirelessly from the magnetic field and fourth means for transferring or receiving power wirelessly, the third and fourth transferring or receiving means each wound about the varying means, the third transferring or receiving means at least partially enclosed by the first transferring or receiving means, and the fourth transferring or receiving means at least partially enclosed by the second transferring or receiving means. In certain embodiments, the third and fourth transferring or receiving means can be implemented by the solenoid coils 512A and 512B (FIG. 5A). In certain embodiments, the third and fourth transferring or receiving means identifying can be configured to perform the functions of block 1708 (FIG. 17).

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the implementations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions may not be interpreted as causing a departure from the scope of the implementations of the invention.

The various illustrative blocks, modules, and circuits described in connection with the implementations disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the implementations disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. A storage medium is coupled to the processor such that the processor may read information from, and write information to, the storage medium. In the alternative, the storage medium may be integral to the processor. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above may also be included within the scope of computer readable media. The processor and the storage medium may reside in an ASIC.

For purposes of summarizing the disclosure, certain aspects, advantages and novel features of the inventions have been described herein. It is to be understood that not necessarily all such advantages may be achieved in accordance with any particular implementation of the invention. Thus, the invention may be embodied or carried out in a manner that achieves or optimizes one advantage or group of advantages as taught herein without necessarily achieving other advantages as may be taught or suggested herein.

Various modifications of the above described implementations will be readily apparent, and the generic principles defined herein may be applied to other implementations without departing from the spirit or scope of the invention. Thus, the present invention is not intended to be limited to the implementations shown herein but is to be accorded the widest scope consistent with the principles and novel features disclosed herein.

What is claimed is:

1. An apparatus for wireless power transfer, comprising:
a first coil enclosing a first area;
a second coil enclosing a second area different than the first area, the second coil positioned to be at least partially coplanar with the first coil;
a ferrite material; and
a third coil and a fourth coil each wrapped around in a same wrapping direction and in contact with a surface of the ferrite material, the third coil at least partially enclosed by the first coil and the fourth coil at least partially enclosed by the second coil and the third and fourth coils positioned to be at least partially coplanar with the first and second coils, wherein the first, second, third, and fourth coils are configured to travel in a direction orthogonal to the wrapping direction of the third and fourth coils.

2. The apparatus of claim 1, wherein the third and fourth coils are connected in series such that the third and fourth coils are not mutually coupled with the first and second coils.

3. The apparatus of claim 1, further comprising a ferrite layer, wherein the ferrite layer is positioned between the third and fourth coils and a mounting plate.

4. The apparatus of claim 1, wherein the first, second, third, and fourth coils are mounted to a vehicle via a mounting plate.

5. The apparatus of claim 1, wherein the third and fourth coils each comprise a plurality of adjacent windings wound about the ferrite material forming the third and fourth coils and wherein the plurality of adjacent windings have greater average spacing on a first surface of the ferrite material as compared to their average spacing on a second surface of the ferrite material.

6. The apparatus of claim 1, wherein the first and second coils are configured to receive wireless power via a first magnetic field component of a magnetic field generated by a transmitter and the third and fourth coils are configured to receive wireless power via a second magnetic field component of the magnetic field generated by the transmitter.

7. The apparatus of claim 6, wherein the ferrite material is positioned to cause the magnetic field to vary in distribution based on a position of the ferrite material relative to the magnetic field.

8. The apparatus of claim 6, wherein the first magnetic field component and the second magnetic field component are offset from each other in a direction of travel.

9. The apparatus of claim 1, wherein the first and second coils are configured to generate a first magnetic field component to transmit wireless power and the third and fourth coils are configured to generate a second magnetic field component to transmit wireless power to a wireless power receiver.

10. The apparatus of claim 9, wherein the first magnetic field component and the second magnetic field component are offset from each other in a direction of travel.

11. The apparatus of claim 1, wherein the first and second coils together are positioned in a double-D coil configuration and wherein the third and fourth coils wound about the ferrite material form solenoid coil configurations.

12. The apparatus of claim 1, wherein the third and fourth coils are connected in a series opposing configuration.

13. The apparatus of claim 1, wherein the third and fourth coils are connected such that a current in each of the third and fourth coils flows in an opposite direction relative to the current of the other coil.

14. A method for receiving wireless power, comprising:
receiving power wirelessly from a magnetic field via a first coil enclosing a first area and a second coil enclosing a second area different than the first area, the second coil positioned to be at least partially coplanar with the first coil;
receiving power wirelessly from the magnetic field via a third coil and a fourth coil, each of the third and fourth coils wrapped around in a same wrapping direction and in contact with a surface of a ferrite material, the third coil at least partially enclosed by the first coil and the fourth coil at least partially enclosed by the second coil and the third and fourth coils positioned to be at least partially coplanar with the first and second coils, wherein the first, second, third, and fourth coils are configured to travel in a direction orthogonal to the wrapping direction of the third and fourth coils; and
charging or powering a load with the wirelessly received power.

15. The method of claim 14, further comprising varying a distribution of the magnetic field based on a position of the ferrite material relative to the magnetic field.

16. The method of claim 14, wherein each of the third and fourth coils comprises a plurality of adjacent coils wound about the ferrite material and wherein the plurality of adjacent coils have greater average spacing on a first surface of the ferrite material as compared to another average spacing on a second surface of the ferrite material.

17. The method of claim 14, wherein the third and fourth coils are connected in series such that the third and fourth coils are not mutually coupled with the first and second coils.

18. The method of claim 14, wherein receiving power wirelessly via the first and second coils comprises receiving power wirelessly via a first magnetic field component of the magnetic field generated by a transmitter and wherein receiving power wirelessly via the third and fourth coils comprises receiving power wirelessly via a second magnetic field component of the magnetic field generated by the transmitter, wherein the first magnetic field component and the second magnetic field component are offset from each other in a direction of travel.

19. The method of claim 14, further comprising:
generating a second magnetic field via the first coil and the second coil; and
generating a third magnetic field via the third coil and the fourth coil each wound about the ferrite material.

20. The method of claim 14, wherein the first and second coils comprise a double-D coil and wherein the third and fourth coils comprise a solenoid coil wound about a ferrite material.

21. The method of claim 14, wherein the third and fourth coils are connected in a series opposing configuration.

22. The method of claim 14, wherein the third and fourth coils are connected such that a current in each of the third and fourth coils flows in an opposite direction relative to the current of the other coil.

23. An apparatus for wireless power transfer, comprising:
first means for transferring or receiving power wirelessly enclosing a first area;
second means for transferring or receiving power wirelessly enclosing a second area different from the first area, the second transferring or receiving means positioned to be at least partially coplanar with the first transferring or receiving means;
means for varying distribution of a magnetic field;
third means for transferring or receiving power wirelessly; and
fourth means for transferring or receiving power wirelessly, the third and fourth transferring or receiving means each wrapped around in a same wrapping direction and in contact with a surface of the varying means, the third transferring or receiving means at least partially enclosed by the first transferring or receiving means and the fourth transferring or receiving means at least partially enclosed by the second transferring or receiving means and the third transferring or receiving means and the fourth transferring or receiving means positioned to be at least partially coplanar with the first transferring or receiving means and the second transferring or receiving means, wherein the first transferring or receiving means, the second transferring or receiving means, the third transferring or receiving means, and the fourth transferring or receiving means are configured to travel in a direction orthogonal to the wrapping direction of the third transferring or receiving means and the fourth transferring or receiving means.

24. The apparatus of claim 23, wherein the first and second transferring or receiving means comprise a double-D coil and wherein the third and fourth transferring or receiving means and the flow varying means comprise a solenoid coil or wherein the third and fourth transferring or receiving means are connected in series such that the third and fourth transferring or receiving means are not mutually coupled with the first and second transferring or receiving means.

25. The apparatus of claim 23, wherein each of the third and fourth transferring or receiving means comprises a plurality of adjacent windings wound about the varying means forming the third and fourth transferring or receiving means and wherein the plurality of adjacent windings have greater average spacing on a first surface of the varying means as compared to another average spacing on a second surface of the varying means.

26. The apparatus of claim 23, wherein the first and second transferring or receiving means are configured to generate a first magnetic field component to transmit wireless power and the third and fourth transferring or receiving means are configured to generate a second magnetic field component to transmit wireless power to a wireless power receiver.

27. An apparatus for inductive power transfer, comprising:
 a double-D coil structure; and
 a first solenoid coil and second solenoid coil each wrapped around in a same wrapping direction and in contact with a surface of a ferrite material and positioned at least partially within open areas defined by the double-D coil structure, wherein the double-D coil structure and the first and second solenoid coils are configured to travel in a direction orthogonal to the wrapping direction of the first and second solenoid coils.

28. The apparatus of claim 27, wherein the first and second solenoid coils are connected in a series opposing configuration.

* * * * *